United States Patent
Marshall et al.

(10) Patent No.: US 12,436,823 B2
(45) Date of Patent: Oct. 7, 2025

(54) TECHNIQUES FOR COORDINATING DEVICE ACTIVITY

(71) Applicant: Apple Inc., Cupertino, CA (US)

(72) Inventors: Scott M. Marshall, Los Altos, CA (US); Darren S. Litzinger, Los Gatos, CA (US); Jeremy A. Wyld, San Diego, CA (US); John J. Iarocci, Los Gatos, CA (US)

( * ) Notice: Subject to any disclaimer, the term of this patent is extended or adjusted under 35 U.S.C. 154(b) by 0 days.

(21) Appl. No.: 18/504,057

(22) Filed: Nov. 7, 2023

(65) Prior Publication Data
US 2024/0403144 A1     Dec. 5, 2024

Related U.S. Application Data

(60) Provisional application No. 63/470,960, filed on Jun. 4, 2023.

(51) Int. Cl.
*G06F 9/54* (2006.01)
*G06F 11/34* (2006.01)

(52) U.S. Cl.
CPC .............. *G06F 9/54* (2013.01); *G06F 11/34* (2013.01)

(58) Field of Classification Search
CPC .................................. G06F 9/54; G06F 11/34
See application file for complete search history.

(56) References Cited

U.S. PATENT DOCUMENTS

| | | | |
|---|---|---|---|
| 2011/0117890 A1* | 5/2011 | Lundgren | H04M 3/42153 455/414.1 |
| 2023/0116141 A1* | 4/2023 | Jacob | G06Q 10/063112 705/7.17 |
| 2023/0214734 A1* | 7/2023 | Jacob | G06Q 10/063114 705/7.14 |
| 2023/0247241 A1* | 8/2023 | Roberts | H04N 21/44204 725/109 |

* cited by examiner

Primary Examiner — Farzana B Huq

(57) ABSTRACT

Some techniques are described herein for coordinating device activity, with devices included in one or more different groups of devices. One technique includes coordinating activities among a group as coordinator. For example, in a group of devices, a coordinator device obtains a cluster list of activities from each member device in the group. The coordinator device establishes a new cluster list of activities based on each received cluster list of activities and sends the new cluster list to the member devices. Another technique includes coordinating changes of the coordinator role as a member. Another technique includes changing state of activities via an assertion system. Another technique includes selectively sending requests to change states of local activities. Yet another technique includes a distributed mechanism for selecting a primary device to interact with a user.

60 Claims, 16 Drawing Sheets

TECHNIQUES FOR COORDINATING DEVICE ACTIVITY

CROSS-REFERENCE TO RELATED APPLICATIONS

The present application claims the benefit of U.S. Provisional Patent Application Ser. No. 63/470,960, entitled "TECHNIQUES FOR COORDINATING DEVICE ACTIVITY," filed Jun. 4, 2023, which is hereby incorporated herein by reference in its entirety and made part of the present U.S. Utility Patent Application for all purposes.

This application is related to U.S. Patent Application Publication Nos. 2022/0303888 and 2022/0303186, which are hereby incorporated by reference in their entirety.

BACKGROUND

Electronic devices are becoming increasingly interconnected. For example, an electronic device (e.g., a controller, such as a user device, or an accessory, such as a speaker, a fan, or a thermostat) is often configured to communicate with other electronic devices, and the other electronic devices are often configured to communicate among themselves.

SUMMARY

Current techniques for coordinating device activity are generally ineffective and/or inefficient. For example, some techniques require electronic devices (e.g., smart speakers) to function individually and/or independently manage their own activities without any coordinated effort. However, this approach may lead to inefficiencies and missed opportunities for enhanced collaboration and synchronized operation among these devices. In some examples, the absence of a comprehensive technology that enables seamless coordination and synchronization may hinder the potential for creating a harmonious ecosystem of connected devices.

This disclosure provides more effective and/or efficient techniques for coordinating device activity using a coordinated mechanism for activity synchronization among a group of interconnected devices. Some techniques enable the group to perform synchronized operations, thereby unlocking a new level of efficiency and collaboration between the devices.

It should be recognized that other types of electronic devices can be used with techniques described herein. For example, although techniques described herein may be discussed with respect to smart speakers, any other electronic device or combinations of electronic devices may utilize techniques described herein for coordinating device activity in a group of devices. In addition, techniques optionally complement or replace other techniques for coordinating device activity.

Some techniques are described herein for coordinating device activity. One technique includes coordinating activities among a group as a coordinator of the group. For example, in a group of devices, a coordinator device obtains a cluster list of activities from each member device in the group of devices. The coordinator device establishes a new cluster list of activities from the received cluster list of activities and sends the new cluster list to the member devices. Another technique includes coordinating changes of a coordinator of a group as a member of the group. For example, in a group of devices, a member device synchronizes a set of information (e.g., list of activities) with a first coordinator device. After synchronizing the set of information and in response to detecting a second coordinator device is elected, the member device identifies a locally stored version of the set of information and sends it to the second coordinator device. After sending the set of information, the member device receives a new set of information from the second coordinator device and stores the new set of information as a replacement of the locally stored version. Another technique includes changing state of activities via an assertion system. For example, in a group of devices, a coordinator device receives an assertion corresponding to an activity from one or more member devices in the group and, in response, causes the activity to change state on one or more devices in the group. While the activity is in the new state, the coordinator device receives a request to remove the assertion from a member device of the one or more member devices. If there are no more assertions, the coordinator device causes the activity to no longer execute. Yet another technique includes selectively sending requests to change states of local activities. For example, in response to detecting a first request to change a state of a local activity on a first device, the first device, when part of a group (e.g., and/or not a coordinator of the group), sends a second request to change the state of the local activity to a second device but, when not part of a group (e.g., and/or a coordinator of the group), does not send a request to change the state of the local activity to another device.

In some examples, a method that is performed by a first device associated with a group of devices, wherein the group of devices includes a second device and a third device, wherein the second device is different from the first device, and wherein the third device is different from the first device and the second device is described. In some examples, the method comprises: receiving, from the second device, a first cluster list of running activities; receiving, from the third device, a second cluster list of running activities; generating, based on the first cluster list of running activities and the second cluster list of running activities, a third cluster list of running activities corresponding to the group of devices; and providing, to the second device and the third device, the third cluster list of running activities.

In some examples, a non-transitory computer-readable storage medium storing one or more programs configured to be executed by one or more processors of a first device associated with a group of devices including a second device and a third device is described. In some examples, the one or more programs includes instructions for: receiving, from the second device, a first cluster list of running activities; receiving, from the third device, a second cluster list of running activities; generating, based on the first cluster list of running activities and the second cluster list of running activities, a third cluster list of running activities corresponding to the group of devices; and providing, to the second device and the third device, the third cluster list of running activities.

In some examples, a transitory computer-readable storage medium storing one or more programs configured to be executed by one or more processors of a first device associated with a group of devices including a second device and a third device is described. In some examples, the one or more programs includes instructions for: receiving, from the second device, a first cluster list of running activities; receiving, from the third device, a second cluster list of running activities; generating, based on the first cluster list of running activities and the second cluster list of running activities, a third cluster list of running activities corresponding to the group of devices; and providing, to the second device and the third device, the third cluster list of running activities.

In some examples, a first device associated with a group of devices including a second device and a third device is described. In some examples, the first device comprises one or more processors and memory storing one or more program configured to be executed by the one or more processors. In some examples, the one or more programs includes instructions for: receiving, from the second device, a first cluster list of running activities; receiving, from the third device, a second cluster list of running activities; generating, based on the first cluster list of running activities and the second cluster list of running activities, a third cluster list of running activities corresponding to the group of devices; and providing, to the second device and the third device, the third cluster list of running activities.

In some examples, a first device associated with a group of devices including a second device and a third device is described. In some examples, the first device comprises means for performing each of the following steps: receiving, from the second device, a first cluster list of running activities; receiving, from the third device, a second cluster list of running activities; generating, based on the first cluster list of running activities and the second cluster list of running activities, a third cluster list of running activities corresponding to the group of devices; and providing, to the second device and the third device, the third cluster list of running activities.

In some examples, a computer program product is described. In some examples, the computer program product comprises one or more programs configured to be executed by one or more processors of a first device associated with a group of devices including a second device and a third device. In some examples, the one or more programs include instructions for: receiving, from the second device, a first cluster list of running activities; receiving, from the third device, a second cluster list of running activities; generating, based on the first cluster list of running activities and the second cluster list of running activities, a third cluster list of running activities corresponding to the group of devices; and providing, to the second device and the third device, the third cluster list of running activities.

In some examples, a method that is performed by a first device associated with a group of devices including a second device and a third device is described. In some examples, the method comprises: synchronizing, with the second device a set of information; after synchronizing the set of information and in response to detecting a new coordinator is elected for the group of devices: identifying a locally stored version of the set of information; and sending, to the third device, the locally stored version of the set of information; after sending the locally stored version of the set of information, receiving, from the third device, a new set of information; and in response to receiving the new set of information, storing the new set of information as a replacement of the locally stored version of the set of information.

In some examples, a non-transitory computer-readable storage medium storing one or more programs configured to be executed by one or more processors of a first device associated with a group of devices including a second device and a third device is described. In some examples, the one or more programs includes instructions for: synchronizing, with the second device a set of information; after synchronizing the set of information and in response to detecting a new coordinator is elected for the group of devices: identifying a locally stored version of the set of information; and sending, to the third device, the locally stored version of the set of information; after sending the locally stored version of the set of information, receiving, from the third device, a new set of information; and in response to receiving the new set of information, storing the new set of information as a replacement of the locally stored version of the set of information.

In some examples, a transitory computer-readable storage medium storing one or more programs configured to be executed by one or more processors of a first device associated with a group of devices including a second device and a third device is described. In some examples, the one or more programs includes instructions for: synchronizing, with the second device a set of information; after synchronizing the set of information and in response to detecting a new coordinator is elected for the group of devices: identifying a locally stored version of the set of information; and sending, to the third device, the locally stored version of the set of information; after sending the locally stored version of the set of information, receiving, from the third device, a new set of information; and in response to receiving the new set of information, storing the new set of information as a replacement of the locally stored version of the set of information.

In some examples, a first device associated with a group of devices including a second device and a third device is described. In some examples, the first device comprises one or more processors and memory storing one or more program configured to be executed by the one or more processors. In some examples, the one or more programs includes instructions for: synchronizing, with the second device a set of information; after synchronizing the set of information and in response to detecting a new coordinator is elected for the group of devices: identifying a locally stored version of the set of information; and sending, to the third device, the locally stored version of the set of information; after sending the locally stored version of the set of information, receiving, from the third device, a new set of information; and in response to receiving the new set of information, storing the new set of information as a replacement of the locally stored version of the set of information.

In some examples, a first device associated with a group of devices including a second device and a third device is described. In some examples, the first device comprises means for performing each of the following steps: synchronizing, with the second device a set of information; after synchronizing the set of information and in response to detecting a new coordinator is elected for the group of devices: identifying a locally stored version of the set of information; and sending, to the third device, the locally stored version of the set of information; after sending the locally stored version of the set of information, receiving, from the third device, a new set of information; and in response to receiving the new set of information, storing the new set of information as a replacement of the locally stored version of the set of information.

In some examples, a computer program product is described. In some examples, the computer program product comprises one or more programs configured to be executed by one or more processors of a first device associated with a group of devices including a second device and a third device. In some examples, the one or more programs include instructions for: synchronizing, with the second device a set of information; after synchronizing the set of information and in response to detecting a new coordinator is elected for the group of devices: identifying a locally stored version of the set of information; and sending, to the third device, the locally stored version of the set of information; after sending the locally stored version of the set of information, receiving, from the third device, a new set of information; and in response to receiving the new set of information, storing the new set of information as a replacement of the locally stored version of the set of information.

In some examples, a method that is performed by a first device associated with a group of devices including a first respective device different from the first device is described. In some examples, the method comprises: receiving, from the first respective device in the group of devices, a first assertion corresponding to a respective activity; in response to receiving the first assertion corresponding to the respective activity: increasing a number of assertions corresponding to the respective activity; and after increasing the number of assertions and in accordance with a determination that the number of assertions corresponding to the respective activity is currently one, causing the respective activity to execute; while the respective activity is executing, receiving, from a second respective device in the group of devices, a request to remove an assertion corresponding to the respective activity; in response to receiving the request to remove an assertion corresponding to the respective activity: decreasing the number of assertions corresponding to the respective activity; and after decreasing the number of assertions corresponding to the respective activity: in accordance with a determination that the number of assertions corresponding to the respective activity is currently zero, causing the respective activity to no longer execute; and in accordance with a determination that the number of assertions corresponding to the respective activity is currently one or more, forgoing causing the respective activity to no longer execute.

In some examples, a non-transitory computer-readable storage medium storing one or more programs configured to be executed by one or more processors of a first device associated with a group of devices including a first respective device different from the first device is described. In some examples, the one or more programs includes instructions for: receiving, from the first respective device in the group of devices, a first assertion corresponding to a respective activity; in response to receiving the first assertion corresponding to the respective activity: increasing a number of assertions corresponding to the respective activity; and after increasing the number of assertions and in accordance with a determination that the number of assertions corresponding to the respective activity is currently one, causing the respective activity to execute; while the respective activity is executing, receiving, from a second respective device in the group of devices, a request to remove an assertion corresponding to the respective activity; in response to receiving the request to remove an assertion corresponding to the respective activity: decreasing the number of assertions corresponding to the respective activity; and after decreasing the number of assertions corresponding to the respective activity: in accordance with a determination that the number of assertions corresponding to the respective activity is currently zero, causing the respective activity to no longer execute; and in accordance with a determination that the number of assertions corresponding to the respective activity is currently one or more, forgoing causing the respective activity to no longer execute.

In some examples, a transitory computer-readable storage medium storing one or more programs configured to be executed by one or more processors of a first device associated with a group of devices including a first respective device different from the first device is described. In some examples, the one or more programs includes instructions for: receiving, from the first respective device in the group of devices, a first assertion corresponding to a respective activity; in response to receiving the first assertion corresponding to the respective activity: increasing a number of assertions corresponding to the respective activity; and after increasing the number of assertions and in accordance with a determination that the number of assertions corresponding to the respective activity is currently one, causing the respective activity to execute; while the respective activity is executing, receiving, from a second respective device in the group of devices, a request to remove an assertion corresponding to the respective activity; in response to receiving the request to remove an assertion corresponding to the respective activity: decreasing the number of assertions corresponding to the respective activity; and after decreasing the number of assertions corresponding to the respective activity: in accordance with a determination that the number of assertions corresponding to the respective activity is currently zero, causing the respective activity to no longer execute; and in accordance with a determination that the number of assertions corresponding to the respective activity is currently one or more, forgoing causing the respective activity to no longer execute.

In some examples, a first device associated with a group of devices including a first respective device different from the first device is described. In some examples, the first device comprises one or more processors and memory storing one or more program configured to be executed by the one or more processors. In some examples, the one or more programs includes instructions for: receiving, from the first respective device in the group of devices, a first assertion corresponding to a respective activity; in response to receiving the first assertion corresponding to the respective activity: increasing a number of assertions corresponding to the respective activity; and after increasing the number of assertions and in accordance with a determination that the number of assertions corresponding to the respective activity is currently one, causing the respective activity to execute; while the respective activity is executing, receiving, from a second respective device in the group of devices, a request to remove an assertion corresponding to the respective activity; in response to receiving the request to remove an assertion corresponding to the respective activity: decreasing the number of assertions corresponding to the respective activity; and after decreasing the number of assertions corresponding to the respective activity: in accordance with a determination that the number of assertions corresponding to the respective activity is currently zero, causing the respective activity to no longer execute; and in accordance with a determination that the number of assertions corresponding to the respective activity is currently one or more, forgoing causing the respective activity to no longer execute.

In some examples, a first device associated with a group of devices including a first respective device different from the first device is described. In some examples, the first device comprises means for performing each of the following steps: receiving, from the first respective device in the group of devices, a first assertion corresponding to a respective activity; in response to receiving the first assertion corresponding to the respective activity: increasing a number of assertions corresponding to the respective activity; and after increasing the number of assertions and in accordance with a determination that the number of assertions corresponding to the respective activity is currently one, causing the respective activity to execute; while the respective activity is executing, receiving, from a second respective device in the group of devices, a request to remove an assertion corresponding to the respective activity; in response to receiving the request to remove an assertion corresponding to the respective activity: decreasing the number of assertions corresponding to the respective activity; and after decreasing the number of assertions corresponding to the respective activity: in accordance with a determination that the number of assertions corresponding to the respective activity is currently zero, causing the respective activity to no longer execute; and in accordance with a determination that the number of assertions corresponding to the respective activity is currently one or more, forgoing causing the respective activity to no longer execute.

In some examples, a computer program product is described. In some examples, the computer program product comprises one or more programs configured to be executed by one or more processors of a first device associated with a group of devices including a first respective device different from the first device. In some examples, the one or more programs include instructions for: receiving, from the first respective device in the group of devices, a first assertion corresponding to a respective activity; in response to receiving the first assertion corresponding to the respective activity: increasing a number of assertions corresponding to the respective activity; and after increasing the number of assertions and in accordance with a determination that the number of assertions corresponding to the respective activity is currently one, causing the respective activity to execute; while the respective activity is executing, receiving, from a second respective device in the group of devices, a request to remove an assertion corresponding to the respective activity; in response to receiving the request to remove an assertion corresponding to the respective activity: decreasing the number of assertions corresponding to the respective activity; and after decreasing the number of assertions corresponding to the respective activity: in accordance with a determination that the number of assertions corresponding to the respective activity is currently zero, causing the respective activity to no longer execute; and in accordance with a determination that the number of assertions corresponding to the respective activity is currently one or more, forgoing causing the respective activity to no longer execute.

In some examples, a method that is performed by a first device is described. In some examples, the method comprises: detecting a first event corresponding to a first request to change a state of a first activity of the first device; and in response to detecting the first event: in accordance with a determination that the first device is in a group of devices that includes a second device, providing, to the second device, a second request to change a state of the first activity; and in accordance with a determination that the first device is not in the group of devices that includes the second device, forgoing providing, to another device, the second request to change a state of the first activity.

In some examples, a non-transitory computer-readable storage medium storing one or more programs configured to be executed by one or more processors of a first device is described. In some examples, the one or more programs includes instructions for: detecting a first event corresponding to a first request to change a state of a first activity of the first device; and in response to detecting the first event: in accordance with a determination that the first device is in a group of devices that includes a second device, providing, to the second device, a second request to change a state of the first activity; and in accordance with a determination that the first device is not in the group of devices that includes the second device, forgoing providing, to another device, the second request to change a state of the first activity.

In some examples, a transitory computer-readable storage medium storing one or more programs configured to be executed by one or more processors of a first device is described. In some examples, the one or more programs includes instructions for: detecting a first event corresponding to a first request to change a state of a first activity of the first device; and in response to detecting the first event: in accordance with a determination that the first device is in a group of devices that includes a second device, providing, to the second device, a second request to change a state of the first activity; and in accordance with a determination that the first device is not in the group of devices that includes the second device, forgoing providing, to another device, the second request to change a state of the first activity.

In some examples, a first device is described. In some examples, the first device comprises one or more processors and memory storing one or more program configured to be executed by the one or more processors. In some examples, the one or more programs includes instructions for: detecting a first event corresponding to a first request to change a state of a first activity of the first device; and in response to detecting the first event: in accordance with a determination that the first device is in a group of devices that includes a second device, providing, to the second device, a second request to change a state of the first activity; and in accordance with a determination that the first device is not in the group of devices that includes the second device, forgoing providing, to another device, the second request to change a state of the first activity.

In some examples, a first device is described. In some examples, the first device comprises means for performing each of the following steps: detecting a first event corresponding to a first request to change a state of a first activity of the first device; and in response to detecting the first event: in accordance with a determination that the first device is in a group of devices that includes a second device, providing, to the second device, a second request to change a state of the first activity; and in accordance with a determination that the first device is not in the group of devices that includes the second device, forgoing providing, to another device, the second request to change a state of the first activity.

In some examples, a computer program product is described. In some examples, the computer program product comprises one or more programs configured to be executed by one or more processors of a first device. In some examples, the one or more programs include instructions for: detecting a first event corresponding to a first request to change a state of a first activity of the first device; and in response to detecting the first event: in accordance with a determination that the first device is in a group of devices that includes a second device, providing, to the second device, a second request to change a state of the first activity; and in accordance with a determination that the first device is not in the group of devices that includes the second device, forgoing providing, to another device, the second request to change a state of the first activity.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described examples, reference should be made to the Detailed Description below, in conjunction with the following drawings in which like reference numerals refer to corresponding parts throughout the figures.

DETAILED DESCRIPTION

Figure 1:
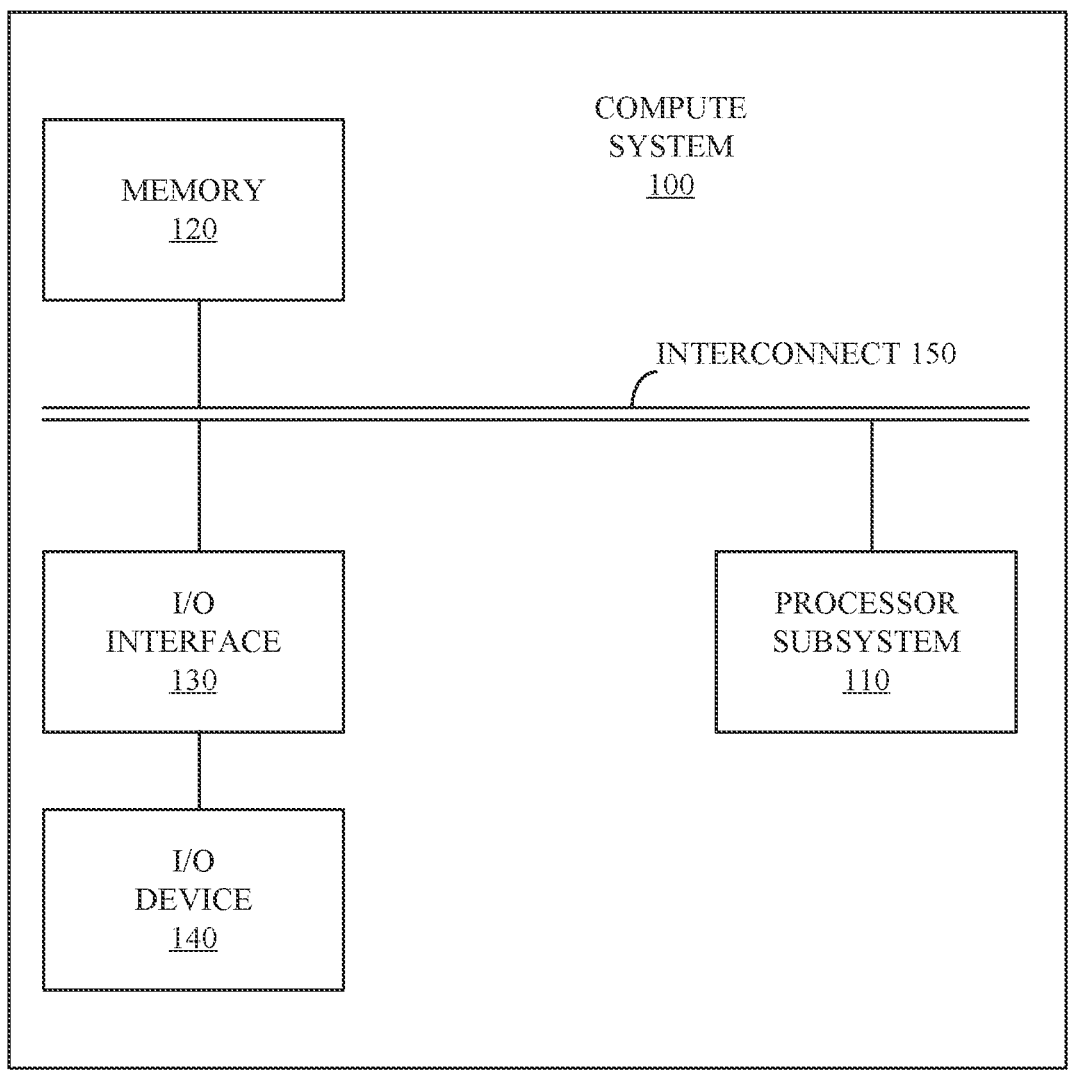
FIG. 1 is a block diagram illustrating a compute system in accordance with some examples.

The following description sets forth exemplary methods, parameters, and the like. It should be recognized, however, that such description is not intended as a limitation on the scope of the present disclosure but is instead provided as a description of exemplary examples.

Methods and/or processes described herein can include one or more steps that are contingent upon one or more conditions being satisfied. It should be understood that a method can occur over multiple iterations of the same process with different steps of the method being satisfied in different iterations. For example, if a method requires performing a first step upon a determination that a set of one or more criteria is met and a second step upon a determination that the set of one or more criteria is not met, a person of ordinary skill in the art would appreciate that the steps of the method are repeated until both conditions, in no particular order, are satisfied. Thus, a method described with steps that are contingent upon a condition being satisfied can be rewritten as a method that is repeated until each of the conditions described in the method are satisfied. This, however, is not required of system or computer-readable medium claims where the system or computer-readable medium claims include instructions for performing one or more steps that are contingent upon one or more conditions being satisfied. Because the instructions for the system or computer-readable medium claims are stored in one or more processors and/or at one or more memory locations, the system or computer-readable medium claims include logic that can determine whether the one or more conditions have been satisfied without explicitly repeating steps of a method until all of the conditions upon which steps in the method are contingent have been satisfied. A person having ordinary skill in the art would also understand that, similar to a method with contingent steps, a system or computer-readable storage medium can repeat the steps of a method as many times as needed to ensure that all of the contingent steps have been performed.

Although the following description uses terms "first," "second," etc. to describe various elements, these elements should not be limited by the terms. In some examples, these terms are used to distinguish one element from another. For example, a first subsystem could be termed a second subsystem, and, similarly, a subsystem device could be termed a subsystem device, without departing from the scope of the various described examples. In some examples, the first subsystem and the second subsystem are two separate references to the same subsystem. In some examples, the first subsystem and the second subsystem are both subsystem, but they are not the same subsystem or the same type of subsystem.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when," "upon," "in response to determining," "in response to detecting," or "in accordance with a determination that" depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," or "in accordance with a determination that [the stated condition or event]" depending on the context.

Turning to FIG. 1, a block diagram of compute system 100 is illustrated. Compute system 100 is a non-limiting example of a compute system that can be used to perform functionality described herein. It should be recognized that other computer architectures of a compute system can be used to perform functionality described herein.

In the illustrated example, compute system 100 includes processor subsystem 110 communicating with (e.g., wired or wirelessly) memory 120 (e.g., a system memory) and I/O interface 130 via interconnect 150 (e.g., a system bus, one or more memory locations, or other communication channel for connecting multiple components of compute system 100). In addition, I/O interface 130 is communicating with (e.g., wired or wirelessly) to I/O device 140. In some examples, I/O interface 130 is included with I/O device 140 such that the two are a single component. It should be recognized that there can be one or more I/O interfaces, with each I/O interface communicating with one or more I/O devices. In some examples, multiple instances of processor subsystem 110 can be communicating via interconnect 150.

Compute system 100 can be any of various types of devices, including, but not limited to, a system on a chip, a server system, a personal computer system (e.g., a smartphone, a smartwatch, a wearable device, a tablet, a laptop computer, and/or a desktop computer), a sensor, or the like. In some examples, compute system 100 is included or communicating with a physical component for the purpose of modifying the physical component in response to an instruction. In some examples, compute system 100 receives an instruction to modify a physical component and, in response to the instruction, causes the physical component to be modified. In some examples, the physical component is modified via an actuator, an electric signal, and/or algorithm. Examples of such physical components include an acceleration control, a break, a gear box, a hinge, a motor, a pump, a refrigeration system, a spring, a suspension system, a steering control, a pump, a vacuum system, and/or a valve. In some examples, a sensor includes one or more hardware components that detect information about a physical environment in proximity to (e.g., surrounding) the sensor. In some examples, a hardware component of a sensor includes a sensing component (e.g., an image sensor or temperature sensor), a transmitting component (e.g., a laser or radio transmitter), a receiving component (e.g., a laser or radio receiver), or any combination thereof. Examples of sensors include an angle sensor, a chemical sensor, a brake pressure sensor, a contact sensor, a non-contact sensor, an electrical sensor, a flow sensor, a force sensor, a gas sensor, a humidity sensor, an image sensor (e.g., a camera sensor, a radar sensor, and/or a LiDAR sensor), an inertial measurement unit, a leak sensor, a level sensor, a light detection and ranging system, a metal sensor, a motion sensor, a particle sensor, a photoelectric sensor, a position sensor (e.g., a global positioning system), a precipitation sensor, a pressure sensor, a proximity sensor, a radio detection and ranging system, a radiation sensor, a speed sensor (e.g., measures the speed of an object), a temperature sensor, a time-of-flight sensor, a torque sensor, and an ultrasonic sensor. In some examples, a sensor includes a combination of multiple sensors. In some examples, sensor data is captured by fusing data from one sensor with data from one or more other sensors. Although a single compute system is shown in FIG. 1, compute system 100 can also be implemented as two or more compute systems operating together.

In some examples, processor subsystem 110 includes one or more processors or processing units configured to execute program instructions to perform functionality described herein. For example, processor subsystem 110 can execute an operating system, a middleware system, one or more applications, or any combination thereof.

In some examples, the operating system manages resources of compute system 100. Examples of types of operating systems covered herein include batch operating systems (e.g., Multiple Virtual Storage (MVS)), time-sharing operating systems (e.g., Unix), distributed operating systems (e.g., Advanced Interactive executive (AIX), network operating systems (e.g., Microsoft Windows Server), and real-time operating systems (e.g., QNX)). In some examples, the operating system includes various procedures, sets of instructions, software components, and/or drivers for controlling and managing general system tasks (e.g., memory management, storage device control, power management, or the like) and for facilitating communication between various hardware and software components. In some examples, the operating system uses a priority-based scheduler that assigns a priority to different tasks that processor subsystem 110 can execute. In such examples, the priority assigned to a task is used to identify a next task to execute. In some examples, the priority-based scheduler identifies a next task to execute when a previous task finishes executing. In some examples, the highest priority task runs to completion unless another higher priority task is made ready.

In some examples, the middleware system provides one or more services and/or capabilities to applications (e.g., the one or more applications running on processor subsystem 110) outside of what the operating system offers (e.g., data management, application services, messaging, authentication, API management, or the like). In some examples, the middleware system is designed for a heterogeneous computer cluster to provide hardware abstraction, low-level device control, implementation of commonly used functionality, message-passing between processes, package management, or any combination thereof. Examples of middleware systems include Lightweight Communications and Marshalling (LCM), PX4, Robot Operating System (ROS), and ZeroMQ. In some examples, the middleware system represents processes and/or operations using a graph architecture, where processing takes place in nodes that can receive, post, and multiplex sensor data messages, control messages, state messages, planning messages, actuator messages, and other messages. In such examples, the graph architecture can define an application (e.g., an application executing on processor subsystem 110 as described above) such that different operations of the application are included with different nodes in the graph architecture.

In some examples, a message sent from a first node in a graph architecture to a second node in the graph architecture is performed using a publish-subscribe model, where the first node publishes data on a channel in which the second node can subscribe. In such examples, the first node can store data in memory (e.g., memory 120 or some local memory of processor subsystem 110) and notify the second node that the data has been stored in the memory. In some examples, the first node notifies the second node that the data has been stored in the memory by sending a pointer (e.g., a memory pointer, such as an identification of a memory location) to the second node so that the second node can access the data from where the first node stored the data. In some examples, the first node would send the data directly to the second node so that the second node would not need to access a memory based on data received from the first node.

Memory 120 can include a computer-readable medium (e.g., non-transitory or transitory computer-readable medium) usable to store (e.g., configured to store, assigned to store, and/or that stores) program instructions executable by processor subsystem 110 to cause compute system 100 to perform various operations described herein. For example, memory 120 can store program instructions to implement the functionality associated with methods 1200, 1300, 1400, and 1500 (FIGS. 12, 13, 14A, 14B, and 15) described below.

Memory 120 can be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, or the like), read only memory (PROM, EEPROM, or the like), or the like. Memory in compute system 100 is not limited to primary storage such as memory 120. Compute system 100 can also include other forms of storage such as cache memory in processor subsystem 110 and secondary storage on I/O device 140 (e.g., a hard drive, storage array, etc.). In some examples, these other forms of storage can also store program instructions executable by processor subsystem 110 to perform operations described herein. In some examples, processor subsystem 110 (or each processor within processor subsystem 110) contains a cache or other form of on-board memory.

I/O interface 130 can be any of various types of interfaces configured to communicate with other devices. In some examples, I/O interface 130 includes a bridge chip (e.g., Southbridge) from a front-side bus to one or more back-side buses. I/O interface 130 can communicate with one or more I/O devices (e.g., I/O device 140) via one or more corresponding buses or other interfaces. Examples of I/O devices include storage devices (hard drive, optical drive, removable flash drive, storage array, SAN, or their associated controller), network interface devices (e.g., to a local or wide area network), sensor devices (e.g., camera, radar, LiDAR, ultrasonic sensor, GPS, inertial measurement device, or the like), and auditory or visual output devices (e.g., speaker, light, screen, projector, or the like). In some examples, compute system 100 is communicating with a network via a network interface device (e.g., configured to communicate over Wi-Fi, Bluetooth, Ethernet, or the like). In some examples, compute system 100 is directly wired to the network.

Figure 2:
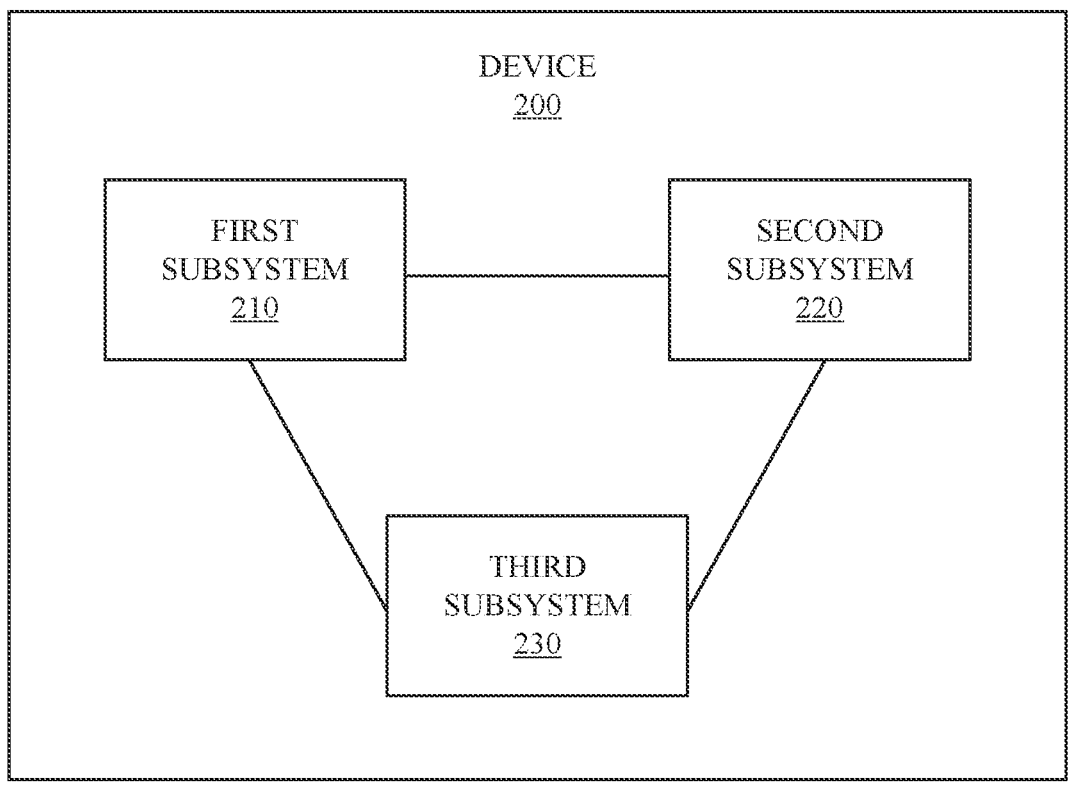
FIG. 2 is a block diagram illustrating a device with interconnected subsystems in accordance with some examples.

FIG. 2 illustrates a block diagram of device 200 with interconnected subsystems. In the illustrated example, device 200 includes three different subsystems (i.e., first subsystem 210, second subsystem 220, and third subsystem 230) communicating with (e.g., wired or wirelessly) each other, creating a network (e.g., a personal area network, a local area network, a wireless local area network, a metropolitan area network, a wide area network, a storage area network, a virtual private network, an enterprise internal private network, a campus area network, a system area network, and/or a controller area network). An example of a possible computer architecture of a subsystem as included in FIG. 2 is described in FIG. 1 (i.e., compute system 100). Although three subsystems are shown in FIG. 2, device 200 can include more or fewer subsystems.

In some examples, some subsystems are not connected to other subsystem (e.g., first subsystem 210 can be connected to second subsystem 220 and third subsystem 230 but second subsystem 220 cannot be connected to third subsystem 230). In some examples, some subsystems are connected via one or more wires while other subsystems are wirelessly connected. In some examples, messages are set between the first subsystem 210, second subsystem 220, and third subsystem 230, such that when a respective subsystem sends a message the other subsystems receive the message (e.g., via a wire and/or a bus). In some examples, one or more subsystems are wirelessly connected to one or more compute systems outside of device 200, such as a server system. In such examples, the subsystem can be configured to communicate wirelessly to the one or more compute systems outside of device 200.

In some examples, device 200 includes a housing that fully or partially encloses subsystems 210-230. Examples of device 200 include a home-appliance device (e.g., a refrigerator or an air conditioning system), a robot (e.g., a robotic arm or a robotic vacuum), and a vehicle. In some examples, device 200 is configured to navigate (with or without user input) in a physical environment.

In some examples, one or more subsystems of device 200 are used to control, manage, and/or receive data from one or more other subsystems of device 200 and/or one or more compute systems remote from device 200. For example, first subsystem 210 and second subsystem 220 can each be a camera that captures images, and third subsystem 230 can use the captured images for decision making. In some examples, at least a portion of device 200 functions as a distributed compute system. For example, a task can be split into different portions, where a first portion is executed by first subsystem 210 and a second portion is executed by second subsystem 220.

As used herein, an "installed application" refers to a software application that has been downloaded onto a computer system (e.g., compute system 100 and/or device 200) and is ready to be launched (e.g., become opened) on the device. In some examples, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of a system/global internal state and/or an application internal state). An open or executing application is, optionally, any one of the following types of applications:

an active application, which is currently displayed on a display screen of the device that the application is being used on;
  a background application (or background processes), which is not currently displayed, but one or more processes for the application are being processed by one or more processors; and
  a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed toward techniques for coordinating device activity. Such techniques are described in the context of four electronic devices in two different groups. It should be recognized that other numbers of electronic devices can be used with techniques described herein. For example, a group may begin with one electronic device and scale to dozens of electronic devices while still using techniques described herein. In addition, techniques optionally complement or replace other techniques for coordinating device activity.

Figure 3:
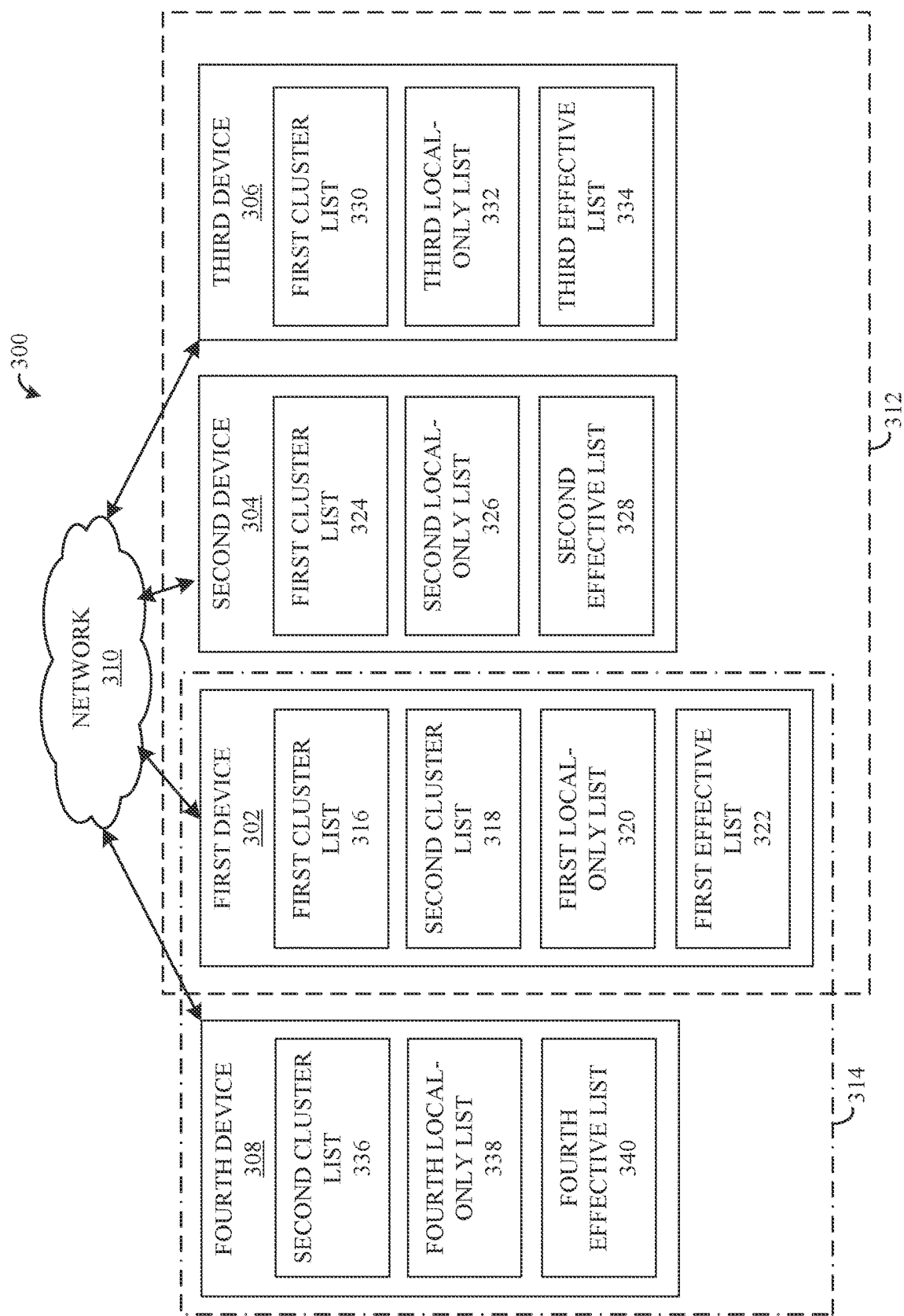
FIG. 3 is a block diagram illustrating four devices forming two groups in accordance with some examples.

FIG. 3 is a block diagram illustrating four devices (e.g., first device 302, second device 304, third device 306, and fourth device 308) forming two groups (e.g., first group 312 and second group 314) in accordance with some examples. Not all of the depicted components may be used in all examples, however, and one or more examples may include additional and/or different components than those shown in FIG. 3. In some examples, one or more devices in FIG. 3 include one or more components described above with respect to compute system 100 and/or device 200. Variations in the arrangement and type of the components may be made without departing from the spirit or scope of the claims as set forth herein. Additional components, different components, and/or fewer components may be used as well.

As illustrated, the four devices of FIG. 3 are included in network environment 300 and are communicatively (e.g., directly or indirectly) coupled to each other via network 310. In some examples, network 310 is an interconnected network of devices that includes, or is communicatively coupled to, the Internet and/or another type of network. For explanatory purposes, network environment 300 is illustrated as including devices 302-308; however, it should be recognized that network environment 300 may include any number of devices communicatively coupled to each other directly or via network 310.

In some examples, devices 302-308 are smart speakers placed throughout a house, a building, and/or a set of multiple buildings. In other examples, first device 302 is a personal device of a user while second device 304 is a smart speaker and third device 306 is a smart light. In some examples, devices 302-308 are arranged into, assigned to, and/or members of one or more groups (e.g., groups 312-314). For example, devices 302-306 may be placed in one room of the house so that a user may control devices 302-306 as a single logical device in one room. As another example, devices 302, 308 may be placed in separate rooms but into second group 314 so that the user may control devices 302, 308 as a single logical device in multiple rooms.

As illustrated in FIG. 3, each device 302-308 includes at least three lists. Such lists include one or more cluster lists, a single local-only list, and a single effective list. In some examples, a cluster list exists for each group or cluster of devices a device is affiliated with. In such examples, the cluster list can specify common (e.g., synchronized) activities (e.g., that are running) of a group or cluster of devices. In some examples, a local-only list exists for each device to allow an individual device to track activities that should not impact a group of devices (e.g., an activity or process that is performing diagnostics only on a particular device and not on the group of devices). In some examples, an effective list combines the one or more cluster lists on a device with the local-only list. In such examples, the effective list can dictate application, process, and/or activity runtime behavior on each device. For example, each of devices 302-308 may have at least one cluster list (e.g., 316, 318, 324, 330, and 336), a local-only list of activities (e.g., 320, 326, 332, and 338), and an effective list of activities (e.g., 322, 328, 334, and 340). In some examples, a cluster list of activities stored on a respective device includes a list of activities running on the respective device and/or a list of activities running on one or more other devices different from the respective device that are in a corresponding group of devices.

In some examples, each device 302-308 includes at least four lists. Such lists can include the lists described above (e.g., one or more cluster lists, a single local-only list, and a single effective list and a pending activity list). In some examples, a pending activity list of a device optimizes performance by allowing an activity to change states (e.g., become active) on the device without being delayed by communication with the coordinator to coordinate the activity with the coordinator and/or other devices in the cluster, thereby improving user experience with respect to responsiveness of the device. With a pending activity list, when a device (e.g., 302-308) generates an assertion in order to activate an activity, the activity may immediately be added to the pending activity list of the device (e.g., in addition to performing one or more existing behaviors with respect to sending an activation change request message to the coordinator, as described further below). In some examples, after adding the activity to the pending activity list, the pending activity list of the device is merged into another list of the corresponding device. For example, the pending activity list may be merged into the effective activity list of the device such that the effective activity list includes the activity.

In some examples, a respective group (e.g., group 312-314) has a coordinator that synchronizes a cluster list of activities between devices in the respective group. For example, devices 302, 308 may be the coordinators for groups 312, 314, respectively. In some examples, a respective coordinator synchronizes a cluster list by generating a cluster list including activities from one or more cluster lists of activities in a group associated with the respective coordinator device (e.g., first cluster list of activities 316, 324, 330 for first group 312). In some examples, a cluster list of activities includes additional information about each activity such as a state of the activity and/or a number of devices in the group asserting usage of the activity. In some examples, a cluster list of activities is published by a coordinator to all devices in a group associated with the coordinator. In some examples with a single device in multiple groups, the single device includes a cluster list of activities specific to each group, each cluster list of activities possibly different based on activities associated with a respective group. In some examples, a published cluster list of activities replaces a cluster list of activities on each device receiving the published cluster list of activities so that all devices in the group include a list of activities running in the group (and, in some examples the same activities in a designated state for a particular device, as discussed further below).

In some examples, devices in a group elect a coordinator for the group in a manner according to U.S. Patent Application Publication No. 2022/0303888.

In some examples, a group of devices includes a distributed mechanism for selecting (e.g., electing) which device in the group of devices is a primary device (sometimes referred to as a leader) for interacting with a user (e.g., playing an alarm/timer tone, issuing a verbal response from a virtual assistant, and/or handling a phone call). It should be recognized that other interactions with a user are within scope of this disclosure and that the examples provided above are meant for discussion purposes. In some examples, determining the primary device is unrelated and/or irrelevant to electing a coordinator of a group of devices. In some examples, the distributed mechanism includes determining a primary device by each device in the group of devices publishing a record to a record repository, an example of which is further described in U.S. Patent Application Publication No. 2022/0303186. In some examples, the record repository is responsible for sharing each record with all other devices in the group of devices. In some examples, the record includes a time indication (e.g., a date and/or timestamp) of when a respective device last requested being the primary device and/or a protocol version number. In some examples, each device in the group of devices subscribes to the record repository. In such examples, when a record is added, removed, and/or modified by a device for a group, a record observer on each device in the group is triggered. In some examples, when a record observer is triggered, the record observer sorts current records known by the record observer (e.g., first by protocol version number and then by the time indication) to identify a winning record (e.g., which will have the highest protocol version number and then most recent time indication if protocol version numbers are equal). In such examples, once the winning record is identified, a device determines whether an identifier (e.g., a UUID) associated with the winning record matches its own identifier. If the identifiers match, the device is the primary device. If the identifiers do not match, the device is not the primary device. In some examples, this distributed mechanism guarantees that each cluster will include exactly one device designated as the primary device and/or is scalable to large group sizes and, in some examples, allows for graceful fallback of the primary device (e.g., if a current leader is removed from a group of devices and/or becomes unavailable (e.g., unplugged or loses network connection), the next most-recently-used device becomes the primary device).

Figure 4:
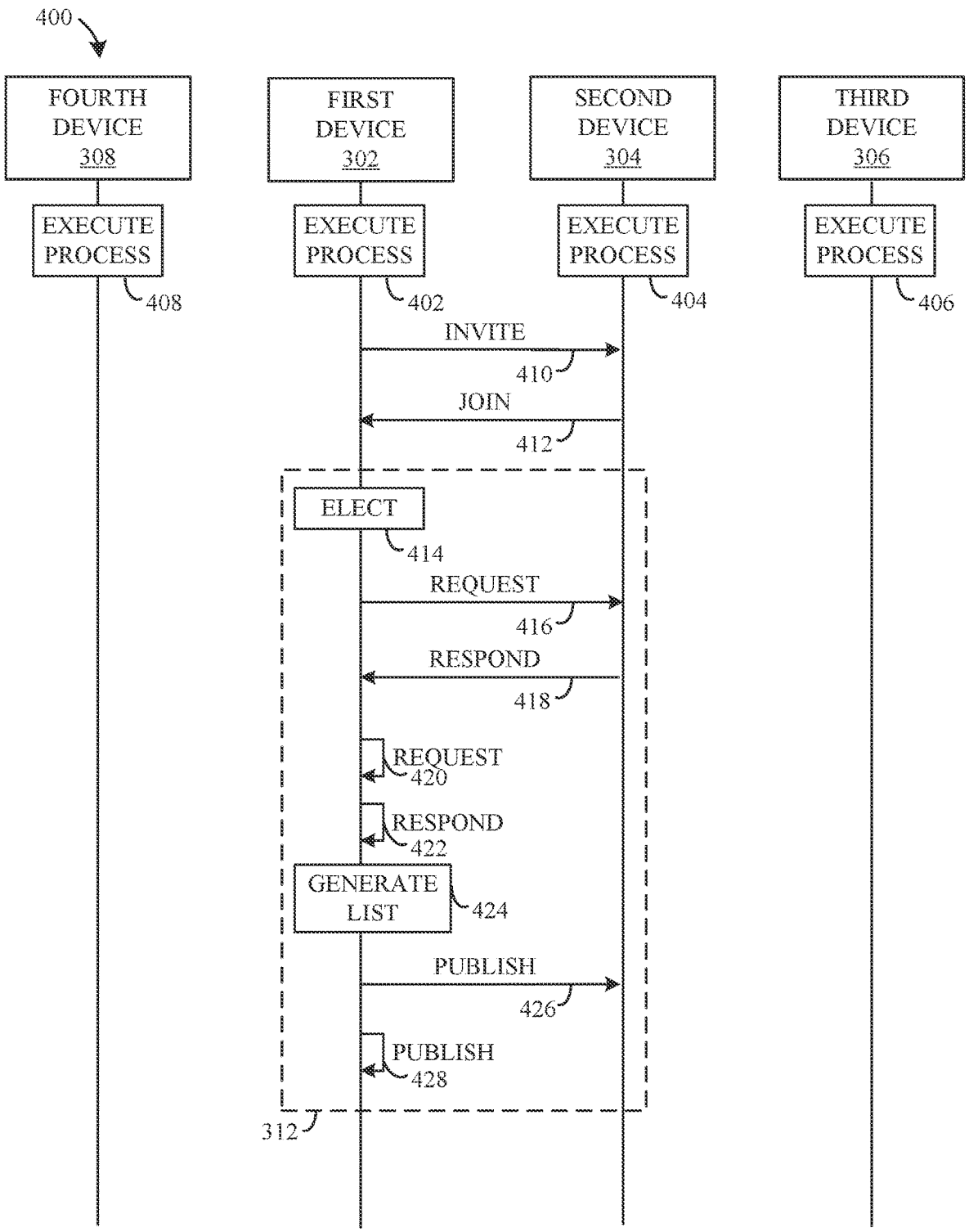
FIG. 4 is a sequence diagram illustrating the four devices of FIG. 3 operating independently and the formation of a first group of devices in accordance with some examples.

FIG. 4 is a sequence diagram (e.g., sequence diagram 400) illustrating the four devices of FIG. 3 (e.g., devices 302-308) operating independently and the formation of a first group (e.g., first group 312) in accordance with some examples. In some examples, prior to forming groups 312-314, devices 302-308 operate independently. For example, as shown by 402-408, devices 302-308 may execute new activities and/or perform operations via such activities without communicating with other devices before performing such operations (e.g., first device 302 executes a first activity and performs a first operation of the first activity without communicating with second device 304, and second device 304 executes a second activity (e.g., the same or different from the first activity) and performs a second operation of the second activity without communicating with first device 302). In some examples, devices 302-308 operate as part of their own group as a sole member of that group before being added to a group of two or more device (e.g., first device 302 is in a group with only first device 302, and second device 304 is in a group with only second device 304) and operate independently as a result of being the only device in a group. In some examples, as independently operating devices, the user sends instructions to each device 302-308 to have them execute the same activities and/or operations, which may be a cumbersome process.

As illustrated by 410, to form (or expand) first group 312 (e.g., to control and/or coordinate multiple devices as a single logical device), first device 302 invites (e.g., sends an invitation to) second device 304 to be a member of first group 312. At 412, after being invited and in response to accepting the invitation, second device 304 joins first group 312.

In some examples, as members of the same group (e.g., first group 312), devices 302-304 perform operations with respect to first group 312, as represented by the dashed line. As illustrated by 414, in response to and/or after second device 304 joining first group 312, an election is triggered, causing devices 302-304 to elect (e.g., in a manner according to U.S. Patent Application Publication No. 2022/0303888) first device 302 as a coordinator of first group 312.

In some examples, as a coordinator of first group 312, first device 302 synchronizes activities among members of first group 312 by generating a cluster list of activities (sometimes referred to as a third cluster list of activities). As illustrated by 416 and 418, to generate the third cluster list of activities, first device 302 requests from (e.g., sends a request to) second device 304 a cluster list of activities (e.g., foreground processes, background processes, idle processes, portions of a process, activities, operations, sets of instructions, and/or the like), to which second device 304 responds accordingly. For example, second device 304 may respond (e.g., to first device 312) with its first cluster list of activities (e.g., first cluster list of activities 324), including a list of activities running in first group 312 as known by second device 304. For example, the first cluster list of activities of second device 304 may include at least the activity executed at 404. As illustrated by 420 and 422, first device 302 also requests (e.g., accesses) its own cluster list of activities and responds with its cluster list of activities (e.g., first cluster list of activities 316). For example, a system process of first device 302 (e.g., a process that manages synchronization of the third cluster list of activities) requests the first cluster list of activities from another system process (e.g., a separate process that manages the first cluster list of activities of first device 302). In some examples, the first cluster list of activities is a list, array, table, or any other data structure including representations of one or more activities. For example, the first cluster list of activities of device 302 may include data structure including a command, location, identifier, or any other representation of the activity executed at 402. Although diagram 400 illustrates first device 302 requesting and receiving first cluster list of activities successively from each member of first group 312, first device 302 may request and receive first cluster list of activities concurrently from each member of first group 312. Although diagram 400 illustrates first device 302 requesting and receiving first cluster list of activities from second device 304 and then itself, first device 302 may request and receive the first cluster list of activities from any member device in first group 312 in any order.

As illustrated by 424, after first device 302 has received the first cluster list of activities from member devices of first group 312, first device 302 generates a third cluster list of activities for first group 312. In some examples, the third cluster list of activities is the first cluster list of activities from a member device that has a most recent timestamp. For example, first device 302 and second device 304 may have the same first cluster list of activities as they executed the same activity at 402-404, respectively; however, if first device 302 executed the activity later than second device 304, then the first cluster list of activities of first device 302 may have a more recent timestamp and thus be selected for use in generating the third cluster list of activities for first group 312. In some examples, the third cluster list of activities is a combination of the received first cluster lists of activities. For example, the third cluster list of activities may be the union of first cluster list of activities 316, 324, 330 (e.g., the third cluster list of activities=first cluster list of activities 316∪first cluster list of activities 324∪first cluster list of activities 330). In some examples, the third cluster list of activities receives a timestamp of the time when it was generated.

As illustrated by 426 and 428, after and/or in response to first device 302 generating the third cluster list of activities for first group 312, first device 302 publishes the third cluster list of activities to member devices of first group 312. For example, first device 302 may publish (e.g., transmit, send, upload, save, write, store, and/or the like) the third cluster list of activities to second device 304 and to itself. In some examples, when a respective device (e.g., first device 302 and/or second device 304) receives the third cluster list of activities, the respective device replaces or otherwise modifies their first cluster list of activities such that the respective device is aware of activities corresponding to first group 312 and/or executes activities included in the third cluster list of activities in a state (e.g., a priority, manner, operation, and/or the like) that is specified by the third cluster list of activities (e.g., for the respective device or for any device in first group 312). For example, if the third cluster list of activities includes an activity in a background state, a device that receives the third cluster list of activities running the activity in a foreground state may continue to run the activity but in a background state. In some examples, if the third cluster list of activities is the same as the first cluster list of activities on a device, the timestamp of the first cluster list of activities on the device may be updated to match the third cluster list of activities.

In some examples, the respective device (e.g., the second device 304) merges the third cluster list of activities with its local-only list of activities (e.g., second local-only list 326) to produce an updated effective activity list (e.g., second effective list 328). The updated effective activity list may include activities from the modified first cluster list and from the local-only list. If the modified first cluster list and the local-only list include an entry for the same activity, the newer entry (e.g., based on an entry timestamp) is selected for the updated effective activity list.

Figure 5:
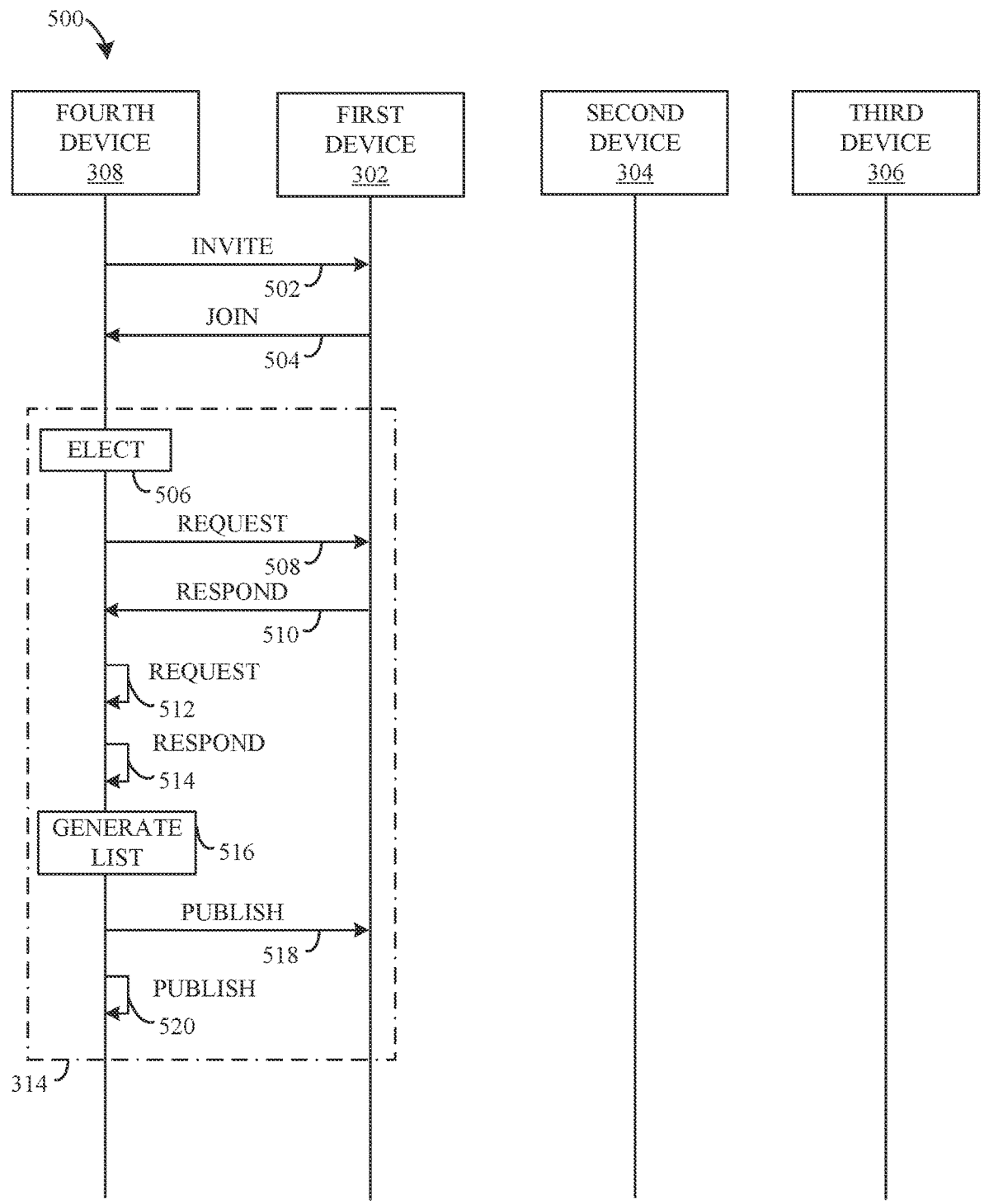
FIG. 5 is a sequence diagram illustrating the four devices of FIGS. 3-4 and the formation of a second group of devices in accordance with some examples.

FIG. 5 is a sequence diagram (e.g., sequence diagram 500) illustrating the four devices (e.g., devices 302-308) of FIGS. 3-4 and the formation of a second group (e.g., second group 314) in accordance with some examples. As mentioned above, in some examples, devices are part of multiple groups. For example, as illustrated by 502, although first device 302 is the coordinator of first group 312 (as described above with respect to FIG. 4), fourth device 308 may invite first device 302 (or, in some examples, first device 302 invites fourth device 308) to be a member of second group 314. As illustrated by 504, after inviting and/or in response to accepting, first device 302 joins second group 314. At this point, first device 302 is part of both first group 312 and second group 314.

In some examples, as members of the same group (e.g., second group 314), devices 302, 308 perform operations with respect to second group 314, as represented by the dashed and dotted line. As illustrated by 506, in response to and/or after first device 302 joining second group 314, an election (e.g., in a manner according to U.S. Patent Application Publication No. 2022/0303888) is triggered, causing devices 302, 308 to elect fourth device 308 as a coordinator of second group 314. It should be recognized that, in some examples, first device 302 is elected as a coordinator of both first group 312 and second group 314. In some examples when a respective device is part of multiple groups, the respective device maintains separate cluster lists of activities for each group. In other examples, the respective device maintains a single cluster list of activities for all groups.

In some examples, as a coordinator of second group 314, fourth device 308 synchronizes activities among members of second group 314 in a manner similar to or the same as first device 302 with respect to first group 312 (e.g., as described above with respect to FIG. 4). For example, at 508 and 510, fourth device 308 requests a cluster list of activities from first device 302 and first device 302 may respond accordingly. In some examples, a device that is a member of multiple groups has a separate list of activities for each group. For example, first device 302 may have a first cluster list of activities (e.g., first cluster list 316) for first group 312 and a second cluster list of activities (e.g., second cluster list 318) for second group 314, in which case first device 302 may respond with the second cluster list of activities at 510.

As illustrated by 512 and 514, fourth device 308 also requests a second cluster list of activities from itself and responds accordingly. The activities in the second cluster list of activities of fourth device 308 may be the same as or different from the activities included in the first cluster list of activities of devices 302-306 in first group 312. As illustrated by 516-520, fourth device 308 also generates a third cluster list of activities and publishes the third cluster list of activities to devices 302, 308 (e.g., not second device 304 and/or third device 306). In some examples, the third cluster list of activities is only published to a part of the group. For example, fourth device 308 may only publish to itself but not to first device 302. In some examples, if the third cluster list of activities published to first device 302 for second group 314 includes a new activity that was not on the first cluster list of activities of first device 302 and first device 302 does not have separate cluster lists of activities for each group 312-314, first device 302 may execute the new activity, after first device 302 publishes a third cluster list of activities including the new activity to second device 304 and third device 306 when first device 302 generates a third cluster list of activities for first group 312.

As illustrated by 516, after fourth device 308 has received the second cluster list of activities from member devices of second group 314, fourth device 308 generates a third cluster list of activities for second group 314. In some examples, the third cluster list of activities is the second cluster list of activities from a member device that has a most recent timestamp. In some examples, the third cluster list of activities is a combination of the received second cluster lists of activities. For example, the third cluster list of activities may be the union of second cluster list of activities 318, 336 (e.g., the third cluster list of activities=second cluster list of activities 318∪second cluster list of activities 336). In some examples, the third cluster list of activities receives a timestamp of the time when it was generated.

As illustrated by 518 and 520, after and/or in response to fourth device 308 generating the cluster list of activities for second group 314, fourth device 308 publishes the third cluster list of activities to member devices of second group 314. For example, second device 308 may publish (e.g., transmit, send, upload, save, write, store, and/or the like) the third cluster list of activities to first device 302 and to itself. In some examples, when a respective device (e.g., first device 302 and/or fourth device 308) receives the third cluster list of activities, the respective device replaces or otherwise modifies their first cluster list of activities such that the respective device is aware of activities corresponding to second group 314 and/or executes activities included in the third cluster list of activities in a state (e.g., a priority, manner, operation, and/or the like) that is specified by the third cluster list of activities (e.g., for the respective device or for any device in second group 314). For example, if the third cluster list of activities includes an activity in a background state, a device that receives the third cluster list of activities running the activity in a foreground state may continue to run the activity but in a background state. In some examples, if the third cluster list of activities is the same as the first cluster list of activities on a device, the timestamp of the first cluster list of activities on the device may be updated to match the third cluster list of activities.

In some examples, the respective device (e.g., the first device 302) merges the third cluster list of activities with its local-only list of activities (e.g., first local-only list 320) to produce an updated effective activity list (e.g., first effective list 322). The updated effective activity list may include activities from the modified first cluster list and from the local-only list. If the modified first cluster list and the local-only list include an entry for the same activity, the newer entry (e.g., based on an entry timestamp) is selected for the updated effective activity list. In some examples, the updated effective activity list may also include activities from other cluster lists (e.g., the second cluster list 318 in the case of the first device 302).

Figure 6:
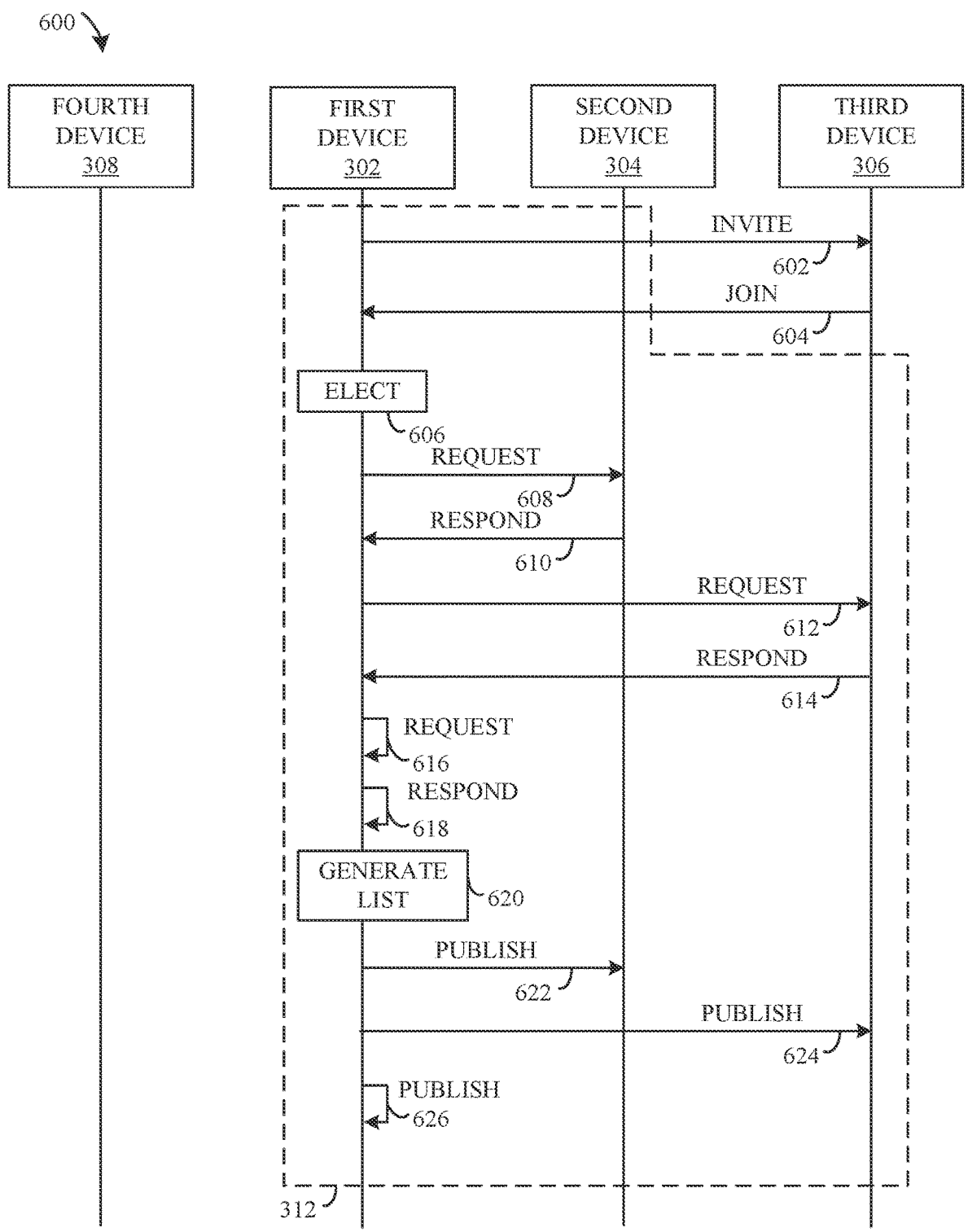
FIG. 6 is a sequence diagram illustrating the four devices of FIGS. 3-5 and the addition of another device into the first group of devices in accordance with some examples.

FIG. 6 is a sequence diagram (e.g., sequence diagram 600) illustrating devices 302-308 and the addition of third device 306 into first group 312 in accordance with some examples. In some examples, additional devices are added to a group thereby allowing more devices to be coordinated and/or the user to control more devices at once. For example, third device 306 may be added to first group 312. To do so, as illustrated by 602, first device 302 invites third device 306 to first group 312. In response, as illustrated by 604, third device 306 accepts the invitation and joins first group 312.

As members of first group 312, devices 302-306 perform operations with respect to first group 312 (e.g., not second group 314), as represented by the dashed line. For example, as illustrated by 606, in response to third device 306 joining first group 312, an election may be triggered causing devices 302-306 to elect first device 302 as the coordinator. In some examples, the election is triggered for the group that the third device 306 is joining and no other group (e.g., second group 314 that shares a common member with first group 312 does not have an election triggered).

As a coordinator of first group 312, first device 302 synchronizes the activities among the members of first group 312. As illustrated by 608-610, first device 302 requests activities from second device 304, and second device 304 responds accordingly. As illustrated by 612-614, first device 302 request activities from third device 306, and third device 306 responds accordingly. As illustrated by 616-618, first device 302 requests activities from itself and responds accordingly. As illustrated by 620-626, first device 302 also generates a third cluster list of activities and publishes the third cluster list of activities to devices 302-306 in a manner similar to 426-428, described above with respect to FIG. 4.

In some examples, the first cluster list of activities of third device 306 (e.g., a device that is new to a group) may not have a timestamp (e.g., because they are not compliant). In which case, first device 302 may not consider the first cluster list of activities of third device 306. In some examples, third device 306 (e.g., a device that is new to a group) may not have a first cluster list of activities. In which case, first device 302 may not consider a first cluster list of activities from third device 306. Alternatively, the first cluster list of activities of third device 306 may be timestamped according to when third device 306 joined first group 312 and/or assumed to have a less recent timestamp than any other first cluster list of activities.

Figure 7:
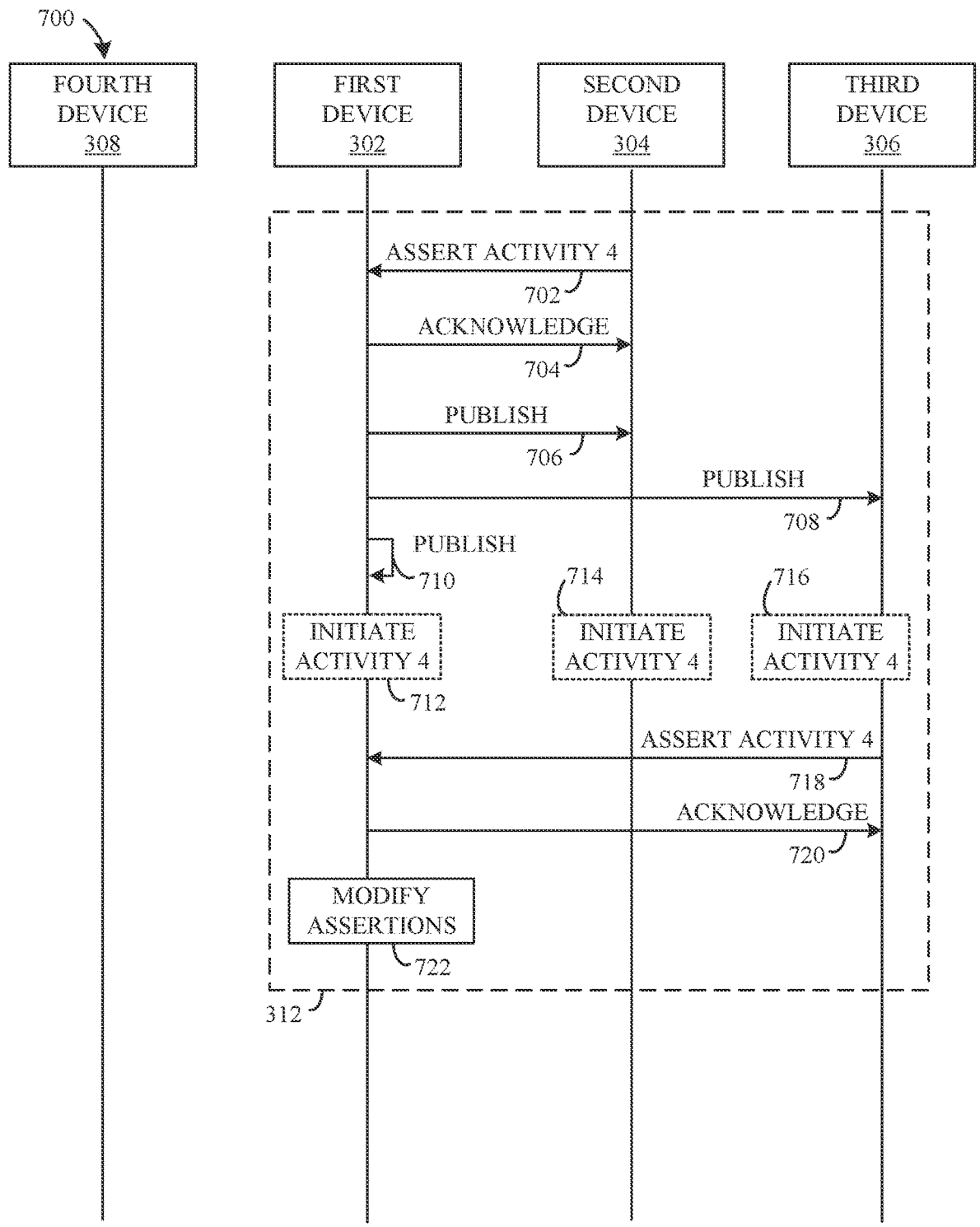
FIG. 7 is a sequence diagram illustrating the four devices of FIGS. 3-6 and the initiation of a new activity to be run in the first group of devices in accordance with some examples.

FIG. 7 is a sequence diagram (e.g., sequence diagram 700) illustrating devices 302-308 and the initiation of a new activity to be run in first group 312 in accordance with some examples. In some examples, the third cluster list of activities is managed by an assertion system to allow devices to declare and/or assert their interest and/or need in a particular resource, activity, and/or state. In some examples, the assertion system provides a way for devices to express their desire for a specific activity to be running. For example, by asserting an activity, a device may indicate that it wants a particular activity to run. In such an example, multiple devices can hold assertions for the same activity, and the coordinator tracks these assertions. In some examples, the assertion system works based on the principle that as long as there is at least one assertion for an activity, the activity remains running. In such examples, if all assertions for an activity are removed or dropped, indicating that no device wants the activity anymore, the activity is terminated.

As illustrated by 702, second device 304 desires to run a new activity and thus asserts the new activity to coordinators of one or more groups that include second device 304, such as first device 302 (e.g., the coordinator of first group 312 that includes first device 302, second device 304, and third device 306). In some examples, the assertion includes a change marker (e.g., hash, UUID, or any other unique identifier). In some examples, when the activity is asserted, second device 304 also adds the activity to a pending activity list of the second device 304 to activate the activity on the second device 304.

As illustrated by 704, first device 302 acknowledges the assertion and updates the third cluster list of activities to include the new activity (e.g., adds an activity ID to the third cluster list of activities). If second device 304 does not receive the acknowledgement of the assertion, second device 304 may resend the assertion. To avoid duplicate assertions in the case that second device 304 sends multiple assertions for the same activity (e.g., acknowledgement was not received for the previous assertion), the assertion may include an identifier, timestamp, and/or the like.

After the third cluster list of activities is updated, as shown by 706-710, first device 302 publishes the third cluster list of activities to devices 302-306 in a manner similar to 426-428, described above with respect to FIG. 4. In some examples, the third cluster list of activities published in 706-710 includes the change marker from the assertion of 702 (e.g., the third cluster list of activities includes the activity and its associated change marker based on the assertion at 702). In this manner, the second device 304 can determine that its assertion has been activated in spite of the asynchronous and variable-latency nature of network communications between devices. In some examples, when the second device 304 has a pending activity list including the activity asserted at 702, the second device 304 also merges the pending activity list into the effective activity list. For example, the merge operation performed by the second device 304 starts with the cluster activity list, merges in the pending activity list, and then merges in the local activity list (later lists may override entries from earlier lists in the merge operation). In examples in which the activity asserted at 702 is associated with a change marker, the activity may be removed from the pending activity list if the cluster activity list contains an entry with the same activity and change marker as an entry in the pending activity list associated with the activity. In some examples, when the new activity is already running on the first device 302, the new activity may be removed from and re-added to the cluster list with the change marker from the assertion of 702.

As illustrated by 712-716, receiving the third cluster list of activities may cause devices 302-306 to update their first cluster list of activities corresponding to first group 312 accordingly and initiate the new activity after merging their cluster list(s) of activities with their local-only list of activities to produce an updated effective list of activities. In some examples, the third cluster list of activities does not cause the new activity to initiate on a device (e.g., when the activity is already running on the device). In some examples, the updated third cluster list of activities causes the new activity to initiate differently on different devices (e.g., different operations, states, priorities (e.g., an activity priority, such that one activity is more urgent than another and should have precedent during execution), and/or the like between devices). In some examples, the third cluster list of activities causes (e.g., indirectly via the effective list being updated in response to publishing the third cluster list) the new activity to initiate differently if the activity is already executing on a device based on another group (e.g., when the other group causes the activity to first initiate in a first manner on a device and the third cluster list of activities in the current group causes the activity to initiate in a second manner on the device).

Although diagram 700 illustrates first device 302 publishing the third cluster list of activities successively for each member of first group 312, first device 302 may publish the third cluster list of activities concurrently for each member of first group 312. Although diagram 700 illustrates first device 302 publishing the third cluster list of activities to second device 304, third device 306, and then itself, first device 302 may publish the third cluster list of activities to any member device in first group 312 in any order.

In some examples, other devices in first group 312 issue their own assertions for the new activity. For example, third device 306 may issue an assertion for the new activity when third device 306 wants the new activity to continue running even if second device 304 no longer wants the new activity to run. In which case, as illustrated by 718-720, third device 306 asserts the new activity to the first device 302, who may acknowledge it. As illustrated by 722, first device 302 modifies the assertions for the new activity to indicate, for example, that there are now two assertions. In some examples, modifying the assertions does not cause other devices in first group 312 to be notified, unless the assertion causes a change of state in the asserted activity. For example, an activity may use second device 304 as a lead device (e.g., to interact with the user) but may change to use third device 306 as a lead device when third device 306 sends its assertion of the activity.

In some examples, when multiple assertions are provided by one or more devices (e.g., by the second device 304 at 702 and third device 306 at 718) and each assertion includes a unique identifier (e.g., a change marker), the first device 302 publishes the cluster list of activities to devices 302-306 for each assertion where the published cluster list of activities includes the unique identifier of the activity corresponding to the assertion. Consequently, each assertion eventually matches a unique identifier in the published cluster list of activities received by each device 302-306, thereby allowing the devices 302-306 to know when their assertion becomes active.

Figure 8:
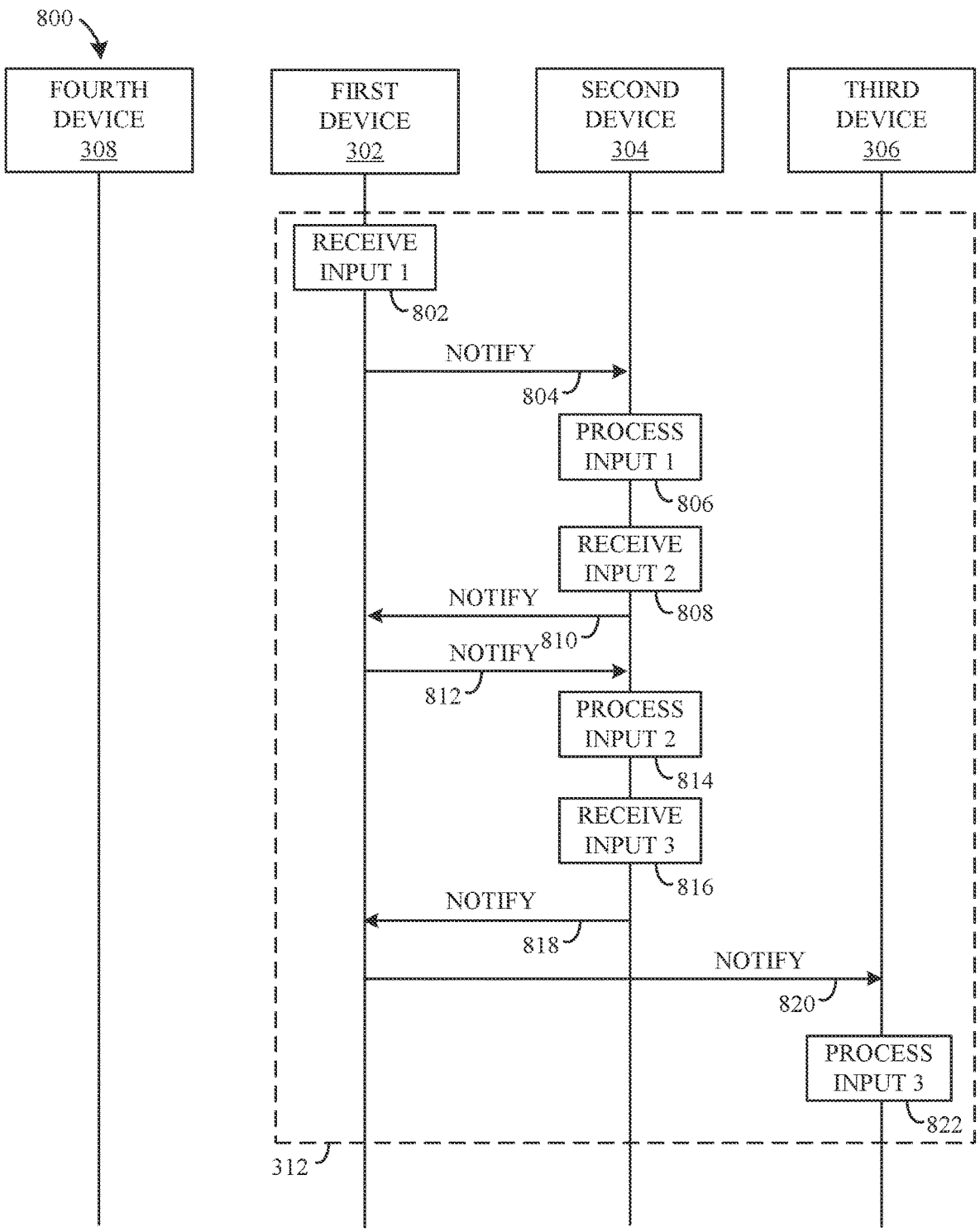
FIG. 8 is a sequence diagram illustrating the four devices of FIGS. 3-7 and the processing of input by the first group in accordance with some examples.

FIG. 8 is a sequence diagram (e.g., sequence diagram 800) illustrating devices 302-308 and the processing of input by first group 312 in accordance with some examples.

Although devices in a group (e.g., devices 302-306 in first group 312) may act as a single logical device, a single device may detect input corresponding to a user and cause another device to provide a response to the input.

As one example, devices 302-306 may be smart speakers playing music (e.g., via a music activity) and a user interacts with a coordinator of first group 312 (e.g., first device 302) to pause the music on one or more devices. At 802, first device receives and/or detects an input from the user corresponding to a request to pause the music by pressing a button of first device 302, speaking a command, and/or the like. As illustrated by 804-806, first device 302 notifies second device 304 to process the input from the user, causing the music to pause on second device 304. In some examples, first device 302 also or instead processes the input itself and/or at third device 306.

In some examples, second device 304 does not have all the information (e.g., libraries, applications, code, and/or the like) associated with the music activity fully installed. In which case, the coordinator of first group 312 may define a policy for the music activity for second device 304 to be able to at least partially execute the activity. For example, second device 304 may not have the full music application corresponding to the music activity installed but may refer to the policy from the coordinator that indicates that the input at 802, for example, corresponds to pausing whatever is playing. This way, second device 304 may still perform some operations with respect to the activity without having the information associated with the activity fully installed in memory. Similarly, in some examples, the coordinator of first group 312 may not have particular applications installed and/or running that are running on other devices in first group 312. In such examples, the coordinator of first group 312 may include a policy and/or description for an application that allows the coordinator to make decisions with respect to the application without needing to be running the application. In some examples, the coordinator of the first group 312 may define the policy for the music activity such that the music activity is ignored on devices that do not recognize the activity. For example, the policy defined by the coordinator of the first group 312 may cause the second device 304 to ignore the music activity. It should be understood that defining a policy may occur for any kind of activity and not only the music activity.

As another example, the user may speak to one non-coordinator smart speaker of a group of smart speakers and expect only that smart speaker to respond, rather than all the smart speakers (although all smart speakers in the group may coordinate to reduce their volumes via a coordinator of the group). As shown by 808, second device 304 receives the user's command (e.g., voice command to initiate the voice assistant activity). In response, as shown by 810, second device 304 notifies the coordinator (e.g., first device 302) of first group 312 to coordinate an appropriate responsive action (e.g., lowering the volume) with first group 312 (e.g., by generating and publishing a third cluster list of activities). As shown by 812, the coordinator may notify second device 304 of any action taken and/or cause second device 304 to take an action. As shown by 814, second device 304 processes the user's voice command and provides an audio and/or visual indication that the voice assistant is ready for further voice commands. In some examples, when second device 304 notifies first device 302 and first device 302 does not know how to respond, first device 302 may request second device 304 to perform the appropriate responsive action (e.g., lower the volume) and instruct first device 302 for first device 302 to coordinate the responsive action with the other devices in first group 312.

As yet another example, the user may speak to one non-coordinator smart speaker in a group of smart speakers to cause a response on another non-coordinator smart speaker in the group. As shown by 816, second device 304 receives the user's command (e.g., voice command to control the volume of third device 306). In response, as shown by 818, second device 304 notifies the coordinator (e.g., first device 302) of first group 312 to coordinate an appropriate responsive action (e.g., volume control) with the target device (e.g., third device 306). As shown by 820, the coordinator notifies third device 306 of the input. In response, as shown by 822, third device 306 activities the input accordingly.

Figure 9:
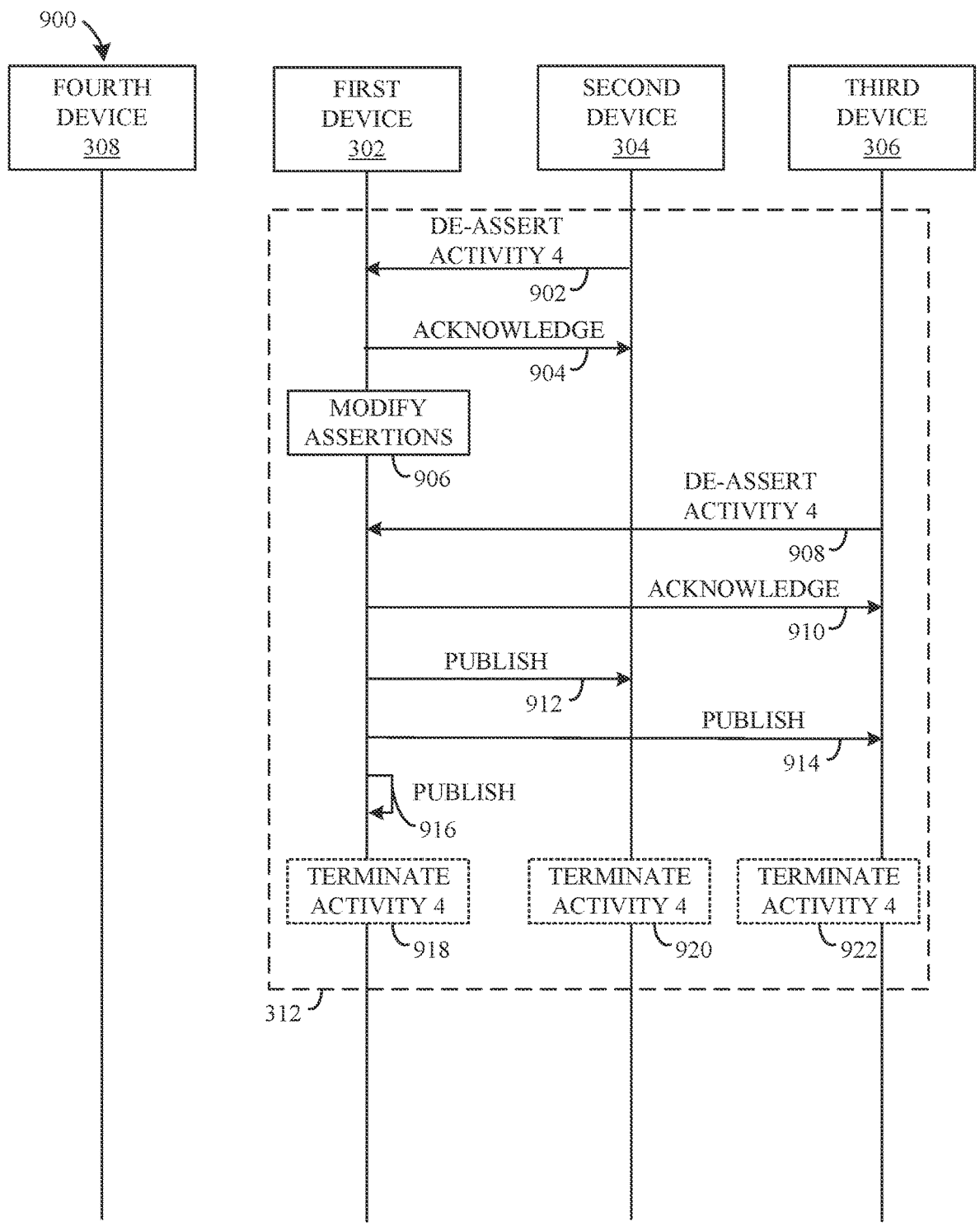
FIG. 9 is a sequence diagram illustrating the four devices of FIGS. 3-8 and the termination of an activity in the first group of devices in accordance with some examples.

FIG. 9 is a sequence diagram (e.g., sequence diagram 900) illustrating devices 302-308 and the termination of an activity in first group 312 in accordance with some examples. As shown in diagram 900, second device 304 no longer desires to run a particular activity (the "target activity"), which in this case is the activity that was twice asserted, as discussed with respect to FIG. 7. As shown by 902-904, second device 304 indicates this by de-asserting the target activity, which first device 302 may acknowledge. In some examples, the target activity is indicated by the unique identifier (e.g., change marker) associated with the target activity on the effective activity list of the second device 304. This way, devices with a stale cluster list of activities may not de-assert activities that are present due to a newer assertion associated with a different change marker.

At this point, as shown by 906, first device 302 modifies the assertions for the target activity. For example, first device 302 may decrement the number of assertions for the target activity. Because the target activity still has assertions, however, the activity continues to run on the devices (e.g., including, in some examples, second device 304), and first device 302 may not need to publish a third cluster list of activities. In some examples, second device 304 is running the activity in a different state (e.g., an active state) than the rest of first group 312 (e.g., a background state) and is the last device running the activity in that state. When second device 304 de-asserts the activity at 902, first device 302 may cause second device 304 to run the activity in another state (e.g., the state that first device 302 or third device 306 is running the activity, such as a background state) and coordinate that change of state with first group 312 (e.g., by generating and publishing a third cluster list of activities).

Subsequently, third device 306 may also no longer desire to run the target activity. As shown by 908-910, third device 306 de-asserts the target activity, which first device 302 may acknowledge. As third device 306 was the final assertion for the target activity and the target activity no longer has any assertions, as shown by 912-916, first device 302 updates the third cluster list of activities and publishes to devices 302-306 in a manner similar to 426-428, described above with respect to FIG. 4. As shown by 918-922, receiving the third cluster list of activities causes devices 302-306 to update their first cluster list of activities accordingly and terminate the target activity (e.g., if a device is running the target activity).

Figure 10:
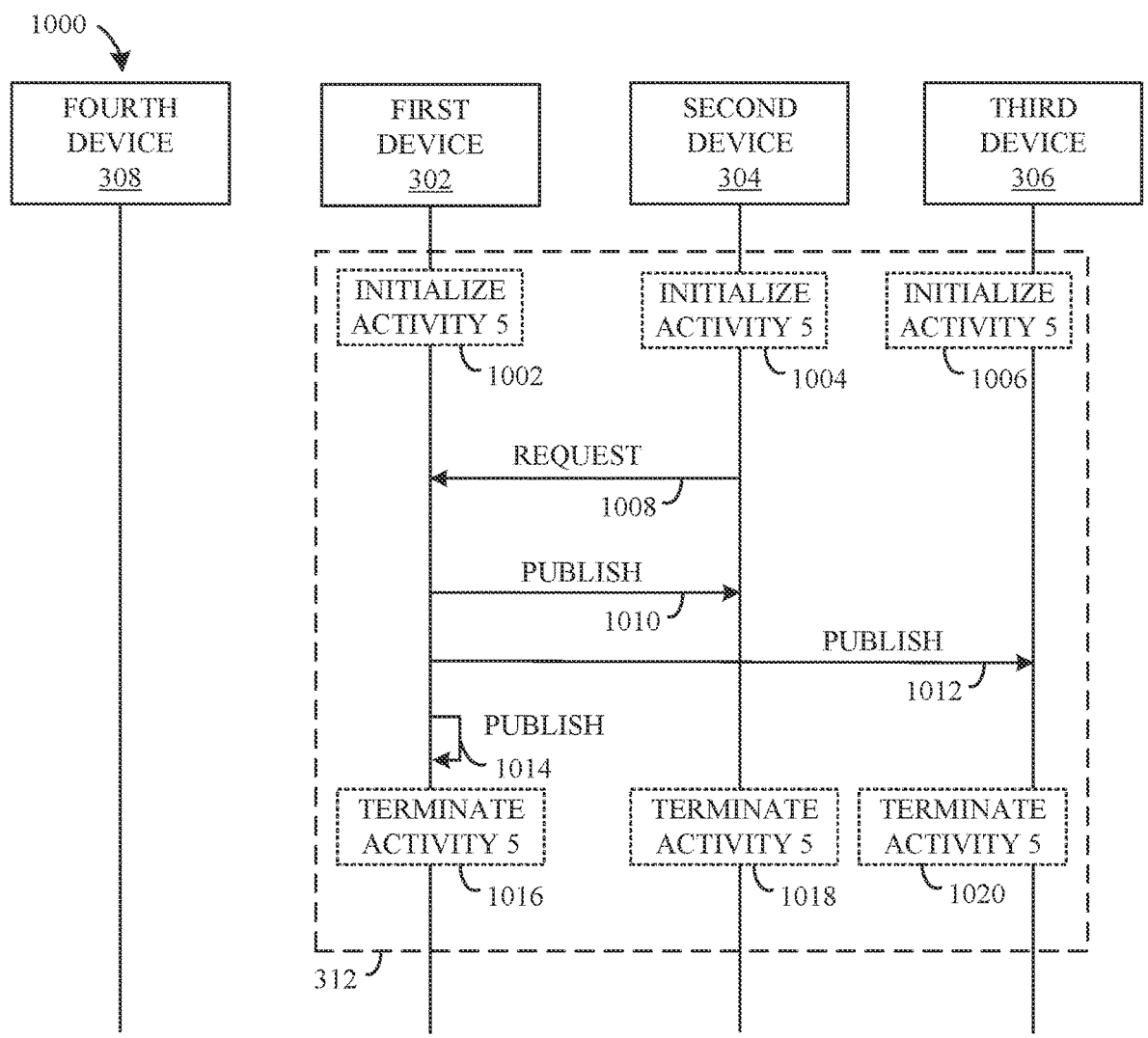
FIG. 10 is a sequence diagram illustrating the four devices of FIGS. 3-9 and the initiation and termination of a new activity in the first group of devices in accordance with some examples.

FIG. 10 is a sequence diagram (e.g., sequence diagram 1000) illustrating devices 302-308 and the initiation and termination of a new activity in first group 312 in accordance with some examples. In addition to the assertion system, an activity may be terminated if the coordinator receives a message requesting that an activity be terminated. In some examples, this may invalidate the activity's outstanding assertions, if the request is approved.

For example, as shown by 1002-1006, a published third cluster list of activities may cause devices 302-306 to initiate a new activity. As the new activity is running, as shown by 1008, second device 304 requests that first device 302 terminates the new activity. Assuming first device 302 approves the request, as shown by 1010-1014, first device 302 updates the third cluster list of activities and publishes the updated third cluster list of activities to devices 302-306 in a manner similar to 426-428, described above with respect to FIG. 4. As shown by 1016-1020, receiving the updated third cluster list of activities causes devices 302-306 to update their first cluster list of activities accordingly and terminate the target activity, respectively. In some examples, devices 302-306 may only terminate the target activity if it is running in the same state as the device that requested to terminate the target activity.

Figure 11:
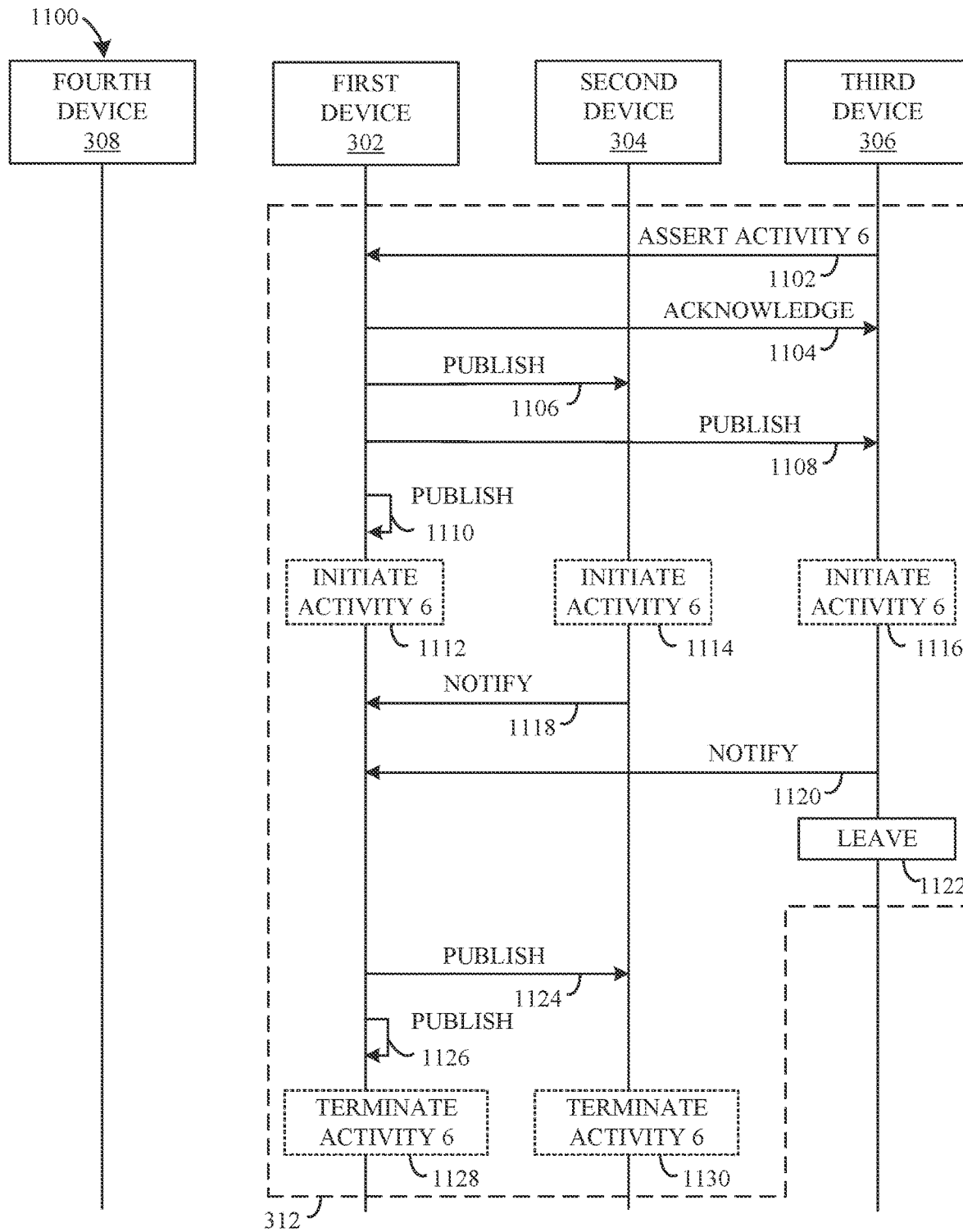
FIG. 11 is a sequence diagram illustrating the four devices of FIGS. 3-10 and the removal of a device from the first group of devices in accordance with some examples.

FIG. 11 is a sequence diagram (e.g., sequence diagram 1100) illustrating devices 302-308 and the removal of third device 306 from first group 312 in accordance with some examples. As part of assertion system, in some examples, when a device leaves the group, its assertions are removed as well.

As shown by 1102, third device 306 desires to run a new activity and thus asserts a new activity to first device 302, who is still the coordinator in this situation. As shown by 1104, first device 302 acknowledges the assertion and updates the third cluster list of activities to include the new activity. As shown by 1106-1110, after the third cluster list of activities is updated, first device 302 publishes the updated third cluster list of activities to devices 302-306 in a manner similar to 426-428, described above with respect to FIG. 4. As shown by 1112-1116, receiving the updated third cluster list of activities causes devices 302-306 to update their first cluster list of activities accordingly and initiate the new activity.

Subsequently, third device 306 leaves first group 312. For example, as shown by 1118-1122, third device 306 may notify devices 302-304 of its departure from the group and then leaves the group. In some examples, as shown by 1122, third device 306 leaves the group without notifying any other members (e.g., third device 306 loses power).

At 1124, in response to the notification of third device 306 leaving, to detection of the third device 306 leaving, and/or to the actual departure of third device 306, first group 312 does not need to elect a new coordinator because third device 306 was not a current coordinator when it left. In examples where third device 306 was a current coordinator when it left, first group 312 would need to elect a new coordinator.

In some examples, in response to the notification of third device 306 leaving and/or in response to the actual departure of third device 306, the coordinator removes assertions from activities that are associated with the leaving device (e.g., third device 306). If there are activities without any remaining assertions, the coordinator updates the third cluster list of activities to remove the new activity and/or cause the new activity to be terminated on one or more devices in first group 312. After the third cluster list of activities is updated, as shown by 1126-1128, the coordinator publishes the updated third cluster list of activities to devices 302-304. As shown by 1130-1132, receiving the updated third cluster list of activities may cause devices 302-304 to update their first cluster list of activities accordingly and terminate the new activity, respectively.

Figure 12:
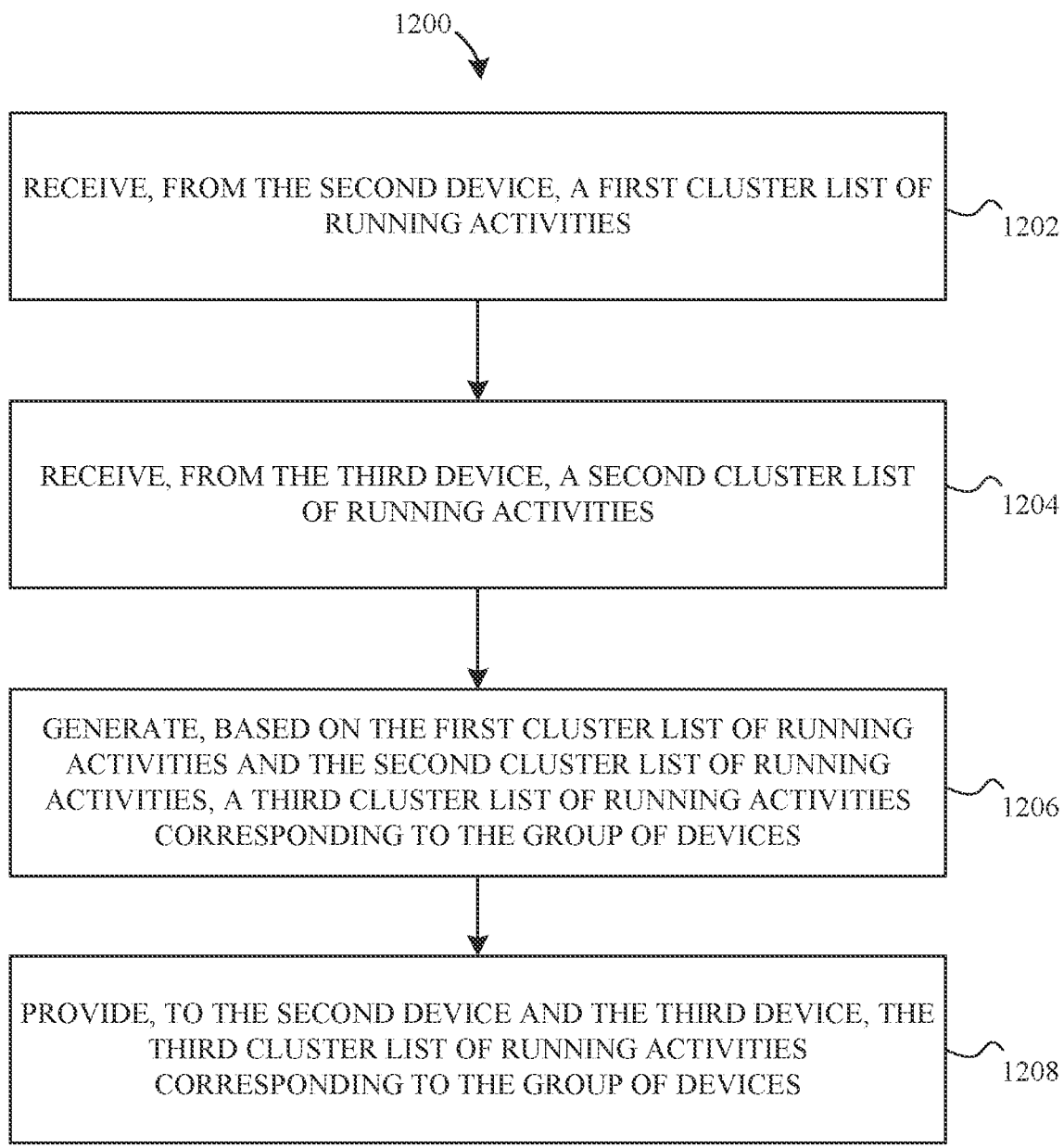
FIG. 12 is a flow diagram illustrating a method for coordinating activities among a group as a coordinator in accordance with some examples.

FIG. 12 is a flow diagram illustrating a method (e.g., method 1200) for coordinating activities among a group as a coordinator in accordance with some examples. Some operations in method 1200 are, optionally, combined, the orders of some operations are, optionally, changed, and some operations are, optionally, omitted.

As described below, method 1200 provides an intuitive way for coordinating activities among a group as a coordinator. Method 1200 reduces the cognitive burden on a user for coordinating activities among a group as a coordinator, thereby creating a more efficient human-machine interface. For battery-operated computing devices, enabling a user to coordinating activities among a group as a coordinator faster and more efficiently conserves power and increases the time between battery charges.

In some examples, method 1200 is performed by a first device (e.g., a coordinator device, a personal device, and/or a communal device) associated with (e.g., in, included in, corresponding to, managing, and/or coordinating) a group of devices (e.g., one or more devices established as a group, multiple devices in communication, multiple devices at least intermittently in communication, multiple devices that are at least partially synchronized with one another, multiple devices that are at least partially coordinated, multiple devices that receive instructions from a single coordinator device (e.g., the first device)), wherein the group of devices includes a second device (e.g., a member device, a personal device, and/or a communal device) and a third device (e.g., a member device, a personal device, and/or a communal device), wherein the second device is different from the first device, and wherein the third device is different from the first device and the second device. In some examples, the first device, the second device, and/or the third device is a phone, a tablet, a laptop, a desktop computer, a fitness tracking device, a wearable device, an accessory device, a smart speaker, and/or a television. In some examples, method 1200 is performed by a system process of the first device, such as a process configured to communicate with respect to the group of devices.

At 1202, the first device (e.g., first device 302) receives (e.g., accesses, downloads, and/or obtains), from the second device (e.g., second device 304), a first cluster list of running activities (e.g., second device 304 may respond at 610 to a request at 608 with the first cluster list of running activities). In some examples, the first cluster list of running activities (e.g., the first cluster list of activities as described above with respect to FIG. 4) includes one or more activities running and/or executing on the second device (e.g., foreground and/or background processes). In some examples, the first cluster list of running activities includes one or more activities running and/or executing on another device (e.g., different from the second device, such as the first device, the third device, and/or another device) in the group of devices. In some examples, the first cluster list of running activities is sent by the second device in response to the second device receiving a request for the first cluster list of running activities from the first device.

At 1204, the first device receives, from the third device (e.g., third device 306), a second cluster list of running activities (e.g., third device 306 may respond at 614 to a request at 612 with the second cluster list of running activities). In some examples, the second cluster list of running activities is the same as or different from the first cluster list of running activities. In some examples, the second cluster list of running activities includes at least one activity in the first cluster list of running activities. In some examples, the second cluster list of running activities includes one or more activities running and/or executing on the third device. In some examples, the second cluster list of running activities includes one or more activities running and/or executing on another device (e.g., different from the third device, such as the first device, the second device, and/or another device) in the group of devices. In some examples, the second cluster list of running activities is sent by the third device in response to the third device receiving a request for the second cluster list of running activities from the first device. In some examples, the first device sends, to the first device and/or the second device, a request for a cluster list of running activities before receiving the first cluster list of running activities and the second cluster list of running activities. In some examples, the first device sends, to the first device and/or the second device, a request for a cluster list of running activities in response to the first device being elected as coordinator of the group of devices.

At 1206, the first device generates (e.g., determines, identifies, and/or creates), based on the first cluster list of running activities and the second cluster list of running activities (e.g., the most recently timestamped cluster list of running activities or a combination of unique and/or non-unique activities between the first and second cluster list of running activities), a third cluster list of running activities (e.g., the third cluster list of running activities supersedes a respective cluster list of running activities on the second device and the third device) corresponding to the group of devices. In some examples, the third cluster list of running activities is the same as the first cluster list of running activities or the second cluster list of running activities. In some examples, the third cluster list of running activities is different from the first cluster list of running activities and the second cluster list of running activities. In some examples, the third cluster list of running activities is generated in response to receiving the first cluster list of running activities and/or the second cluster list of running activities. In some examples, the third cluster list of running activities is generated after receiving the first cluster list of running activities and/or the second cluster list of running activities. In some examples, the third cluster list of running activities is generated in accordance with a determination to send the third cluster list of running activities to devices in the group of devices.

At 1208, the first device provides (e.g., sends, transmits, uploads, and/or stores), to the second device and the third device, the third cluster list of running activities. In some examples, the third cluster list of running activities is provided to each device in the group of devices.

In some examples, at least one device of the group of devices is an accessory device (e.g., a speaker, a TV, a light, a refrigerator, a smart watch, a wearable device, and/or a head mounted display).

In some examples, the first device receives (e.g., accesses, downloads, and/or obtains), by a first activity of the first device (e.g., from a second activity of the first device, the second activity different from the first activity), a fourth cluster list of running activities, wherein the fourth cluster list of activities corresponds to (e.g., is stored by) the first device (e.g., and/or the second activity), and wherein the group of devices includes the first device. In some examples, the fourth cluster list of running activities is the same as or different from the first and/or second cluster list of running activities. In some examples, the fourth cluster list of running activities includes at least one activity in the first and/or second cluster list of running activities. In some examples, the fourth cluster list of running activities includes one or more activities running and/or executing on the first device. In some examples, the fourth cluster list of running activities includes one or more activities running and/or executing on another device (e.g., different from the first device, such as the second device, the third device, and/or another device) in the group of devices. In some examples, the fourth cluster list of running activities is accessed by the first process in response to the first device receiving the first and/or second cluster list of running activities (e.g., from the second and third device respectively). In some examples, the first device and/or the first process sends, to the second device and/or the third device, a request for a cluster list of running activities before receiving the fourth cluster list of running activities. In some examples, the first device and/or the first activity receives the fourth cluster list of activities after (e.g., as a result of) the first device being elected as coordinator of the group of devices.

In some examples, the third cluster list of running activities includes a respective activity not installed (e.g., stored, configured, deployed, and/or integrated), running, or any combination thereof on the first device. In some examples, the respective activity is not included in the fourth cluster list of running activities. In some examples, the respective activity is not installed and/or running on the second device and/or the third device. In some examples, the respective activity is installed and/or running on a fourth device (e.g., the second device, the third device, or a device different from the first device, the second device, and the third device).

In some examples, the first device detects, via an input component (e.g., a keyboard, a touch screen, and/or a microphone) of the first device, an input (e.g., a message, an interaction, and/or an utterance) (e.g., associated with and/or corresponding to the respective activity (e.g., to the activity or while the activity is running)) (e.g., a user interaction and/or an input corresponding to and/or indicative of a user interaction). In some examples, the input component is in communication with the first device. In some examples, the input component is integrated with the first device. In some examples, in response to detecting the input, the first device provides, to another device (e.g., different from the first device) (e.g., the second device, the third device, and/or a device different from the second and third device) of the group of devices, a message (e.g., a notification, an instruction, a signal, a command, and/or a request) to cause a change to the respective activity. In some examples, the message includes an indication of the input, a type of the input, and/or an operation determined by the first device. In some examples, the message is and/or different messages (e.g., corresponding to the input) are provided to multiple devices of the group of devices (e.g., each device in the group of devices). In some examples, the message is provided to a device executing and/or running the respective activity. In some examples, the message is provided to a device managing the respective activity. In some examples, the message is provided to a device with the respective activity as a foreground process (e.g., and or and not to a device with the respective activity as a background process) or vice versa.

In some examples, the third cluster list of running activities is one of (e.g., not a combination) the first cluster list of running activities or the second cluster list of running activities.

In some examples, in accordance with a determination that the first cluster list of running activities is associated with a timestamp more recent than a timestamp associated with the second cluster list of running activities, the third cluster list of running activities is the first cluster list of running activities. In some examples, in accordance with a determination that the second cluster list of running activities is associated with a timestamp more recent than a timestamp associated with the first cluster list of running activities, the third cluster list of running activities is the second cluster list of running activities (e.g., the first cluster list of running process is associated with a first timestamp and the second cluster list of running activities is associated with a second timestamp). In some examples, generating the third cluster list of running activities includes identifying a cluster list of running activities that is associated with a most recent timestamp and establishing the cluster list of running activities that is associated with a most recent timestamp as the third cluster list of activities.

In some examples, the first device is associated with a second group (e.g., second group 314) of devices different from the group of devices (e.g., first group 312). In some examples, the first device synchronizes (e.g., sending a cluster list of running activities and/or receiving a third cluster list of running activities corresponding to the second group of devices) (e.g., separate from one or more operations described above, including operations corresponding to synchronization of the third cluster list of running activities), with the second group of devices, a fifth cluster list of running activities separate from the third cluster list of running activities. In some examples, the fifth cluster list of running activities (e.g., the fifth cluster list of activities 336) is different from the third cluster list of running activities (e.g., the first cluster list of activities 316). In some examples, synchronizing the fifth cluster list of running activities includes sending, to a respective device (e.g., different from the first device) of the second group of devices, a cluster list of running activities. In some examples, the cluster list of running activities sent to the respective device of the second group of devices is different from a cluster list of running activities received by the second activity of the first device with respect to the group of devices. In some examples, synchronizing the fifth cluster list of running activities is with respect to the second group of devices (e.g., and not the group of devices). In some examples, synchronizing the fifth cluster list of running activities is with respect to activities associated with the second group of devices (e.g., and not activities associated with the group of devices). In some examples, the first device is a coordinator of the group of devices and not a coordinator of the second group of devices. In some examples, the first device is a coordinator of the group of devices and the second group of devices.

In some examples, the third cluster list of activities includes a state (e.g., whether an activity is a foreground or background process) of a first respective activity and a state of a second respective activity different from the first respective activity. In some examples, each respective activity of the third cluster list of running activities includes a respective state.

In some examples, each running activity of the third cluster list of running activities is associated with a unique identifier (e.g., a first running activity of the third cluster list of running activities is associated with a third unique identifier, and a second running activity (e.g., different from the first running activity) of the third cluster list of running activities is associated with a fourth unique identifier (e.g., the same as the third unique identifier, such as corresponding to a device, or different from the third unique identifier)). In some examples, the third cluster list of running activities includes the third unique identifier and/or the fourth unique identifier.

In some examples, after providing the third cluster list of running activities to the second device, the first device receives, from the second device, an assertion signal (e.g., a request, a command, and/or a message) including identification of a new activity not included in the third cluster list of running activities (e.g., and, in some examples, not included in the cluster list of running activities received from the second device). In some examples, after (e.g., in response to and/or in conjunction with) receiving the assertion signal, the first device generates a sixth cluster list of running activities different from the third cluster list of running activities, wherein the sixth cluster list of running activities includes an identification of the new activity. In some examples, in response to generating the sixth cluster list of activities (e.g., and/or in response to receiving the assertion signal), the first device provides, to the second device and the third device, the sixth cluster list of running activities. In some examples, the sixth cluster list of activities is provided to each device of the group of devices. In some examples, before generating the sixth cluster list of running activities, the first device executes and/or runs the new activity. In some examples, before generating the sixth cluster list of running activities, the first device provides, to another device of the group of devices (e.g., the second device, the third device, and/or a device other than the second and third device), an instruction, a messages, and/or a request to execute and/or run the new activity.

In some examples, the assertion signal includes a unique identifier corresponding to the new activity. In some examples, the sixth cluster list of running activities includes the unique identifier. In some examples, the unique identifier is generated by the second device. In some examples, the sixth cluster list of running activities includes the unique identifier based on the assertion signal including the unique identifier (e.g., the unique identifier of an entry of the sixth cluster list of running activities is the same as the unique identifier of the assertion signal).

In some examples, after providing the third cluster list of running activities to another device of the group of devices, the first device receives, from a fourth device (e.g., an activity of the first device, the second device, the third device, and/or a different device) of the group of devices, a second assertion signal (e.g., a request, a command, and/or a message) (e.g., the same as the assertion signal or different from the assertion signal) including identification of an existing activity included in the third cluster list of running activities. In some examples, after (e.g., in response to and/or in conjunction with) receiving the second assertion signal, the first device causes (e.g., sends a request to cause) a fifth device (e.g., the first device, the second device, the third device, the fourth device, and/or a different device) of the group of devices to execute the existing activity as a background process. In some examples, after receiving the second assertion signal, the first device causes a sixth device of the group of devices to execute the existing activity as a foreground process. In some examples, after, in response to, and/or in conjunction with causing the fifth device of the group of devices to execute the existing activity as a background process, the first device generates a seventh cluster list of running activities (e.g., indicating that the existing activity is a background process on the fifth device) and provides the seventh cluster list of running activities to one or more devices of the group of devices.

In some examples, after providing the third cluster list of running activities to another device of the group of devices, the first device receives a third assertion signal including identification of a first existing activity included in the third cluster list of running activities. In some examples, the third assertion signal includes an indication of a new state for the first existing activity and/or a request to change a state of the first existing activity to the new state. In some examples, after (e.g., in response to and/or in conjunction with) receiving the third assertion signal, the first device generates an eighth cluster list of running activities including an identification of the first existing activity. (e.g., and/or indicating that the first existing activity is changing state). In some examples, the first device provides the eighth cluster list of running activities to one or more devices of the group of devices. In some examples, after, in response to, and/or in conjunction with receiving the third assertion signal and/or generating the eighth cluster list of running activities, the first device causes the first existing activity to change states according to the third assertion signal.

In some examples, before receiving the third assertion signal, the third cluster list of running activities includes a first unique identifier corresponding to the first existing activity. In some examples, the eighth cluster list of running activities includes a second unique identifier corresponding to the first existing activity. In some examples, the second unique identifier is different from the first unique identifier. In some examples, the eighth cluster list of running activities does not include the first unique identifier. In some examples, the third cluster list of running activities does not include the second unique identifier. In some examples, the third assertion signal includes the second unique identifier.

In some examples, after (e.g., in response to and/or in conjunction with) providing the third cluster list of running activities to another device of the group of devices, the first device receives, from a sixth device of the group of devices, a fourth assertion signal including identification of a second existing activity included in the third cluster list of running activities. In some examples, the fourth assertion signal includes an indication to remove an assertion corresponding to the second existing activity (e.g., and/or corresponding to the sixth device). In some examples, after (e.g., in response to and/or in conjunction with) receiving the fourth assertion signal, the first device generates a ninth cluster list of running activities not including an identification of the second existing activity (e.g., and/or indicating that the second existing activity is has been removed from the ninth cluster list of running activities). In some examples, after, in response to, and/or in conjunction with receiving the fourth assertion signal and/or generating the ninth cluster list of running activities, providing the ninth cluster list of running activities to one or more devices of the group of devices. In some examples, after, in response to, and/or in conjunction with receiving the fourth assertion signal and/or generating the ninth cluster list of running activities, the first device causes the second existing process to no longer run and/or execute.

Note that details of the processes described above with respect to method 1200 (e.g., FIG. 12) are also applicable in an analogous manner to other methods described herein. For example, method 1300 optionally includes one or more of the characteristics of the various methods described above with reference to method 1200. For example, method 1300 relates to changing the coordinator role in a group, and once a coordinator role is changed, the new coordinator may perform method 1200. For brevity, these details are not repeated below.

Figure 13:
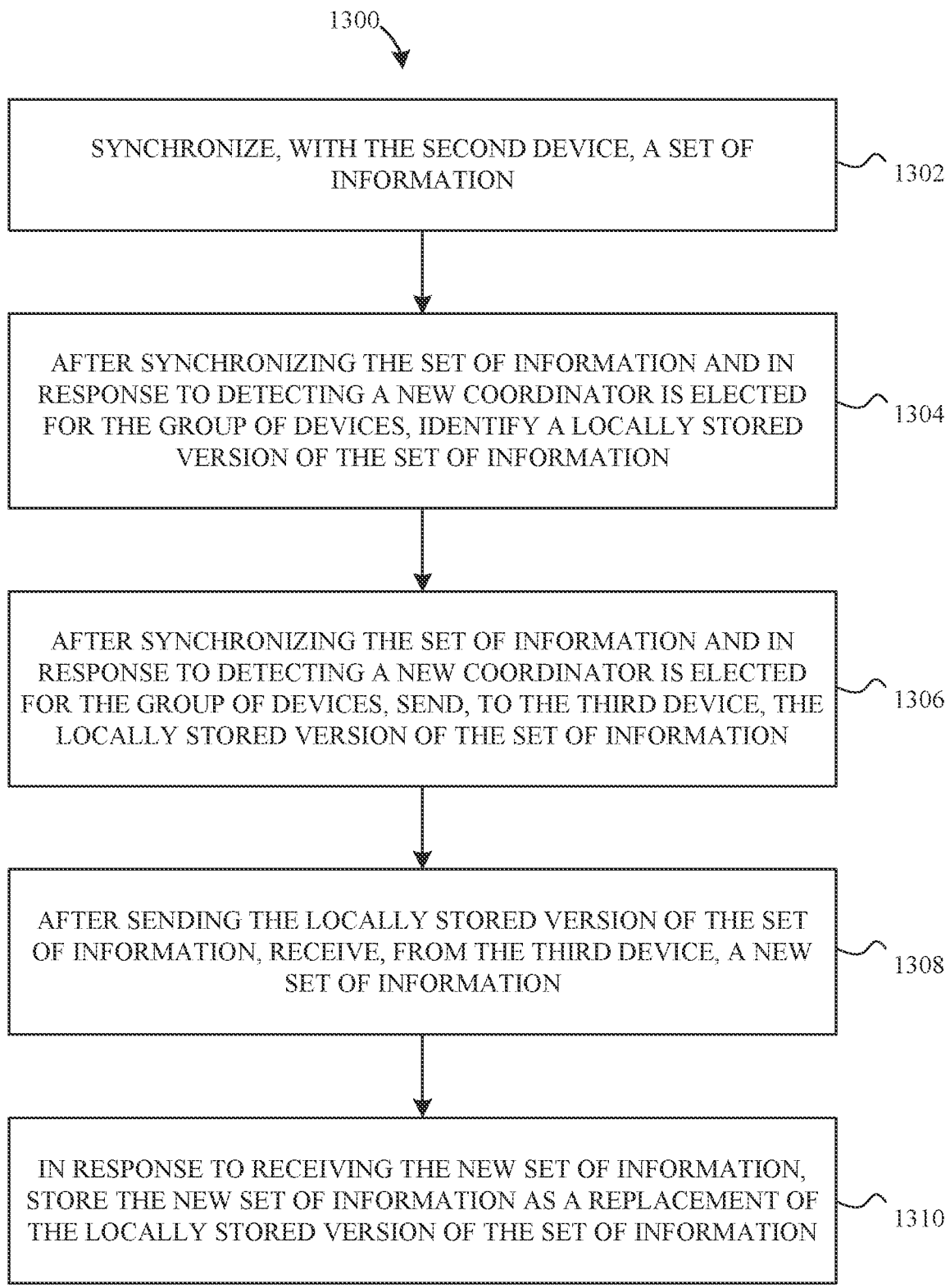
FIG. 13 is a flow diagram illustrating a method for coordinating changes of a coordinator role as a member of a group in accordance with some examples.
Figure 14A:
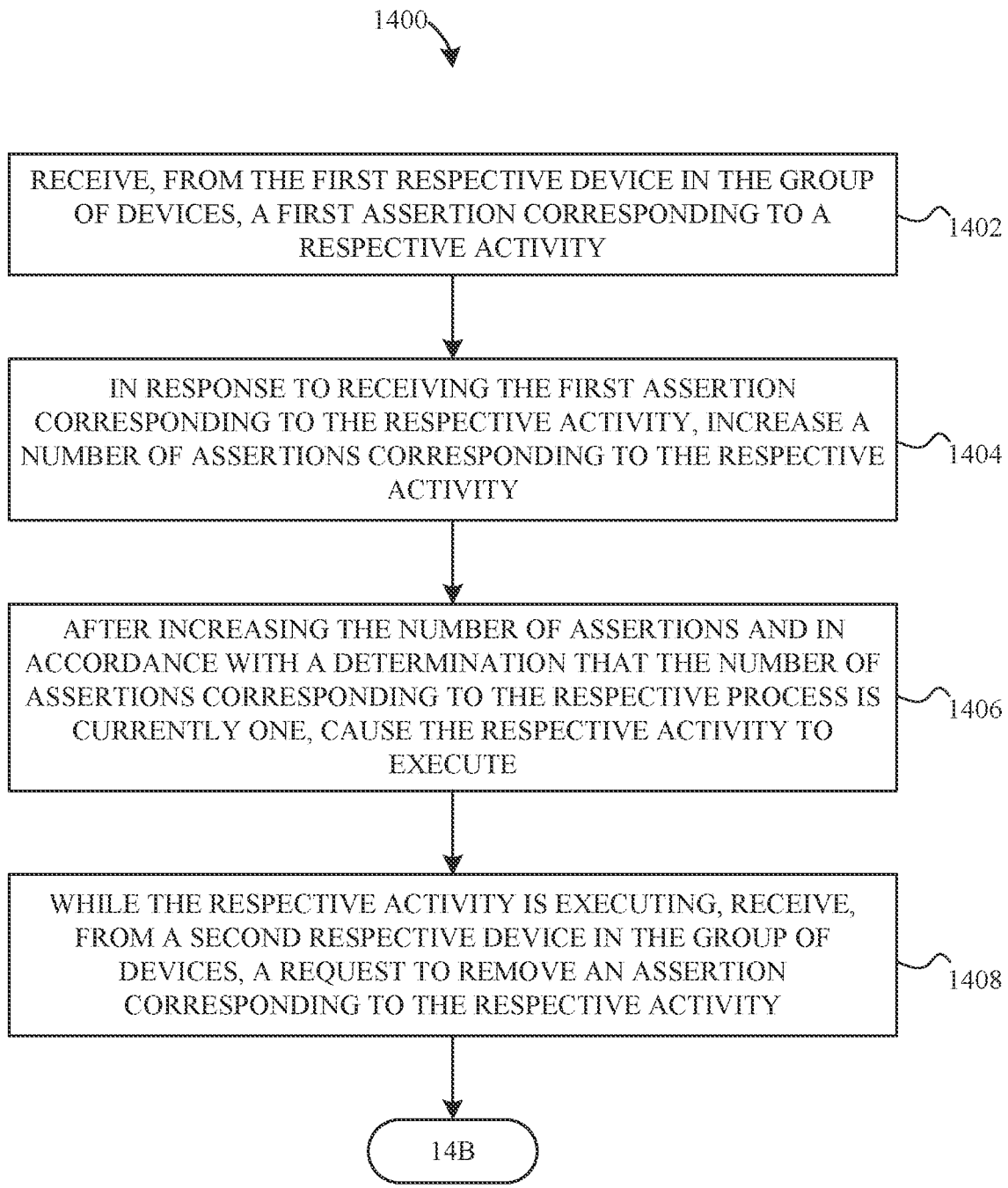
FIG. 14A is a flow diagram illustrating a method for changing a state of an activity in accordance with some examples.
Figure 14B:
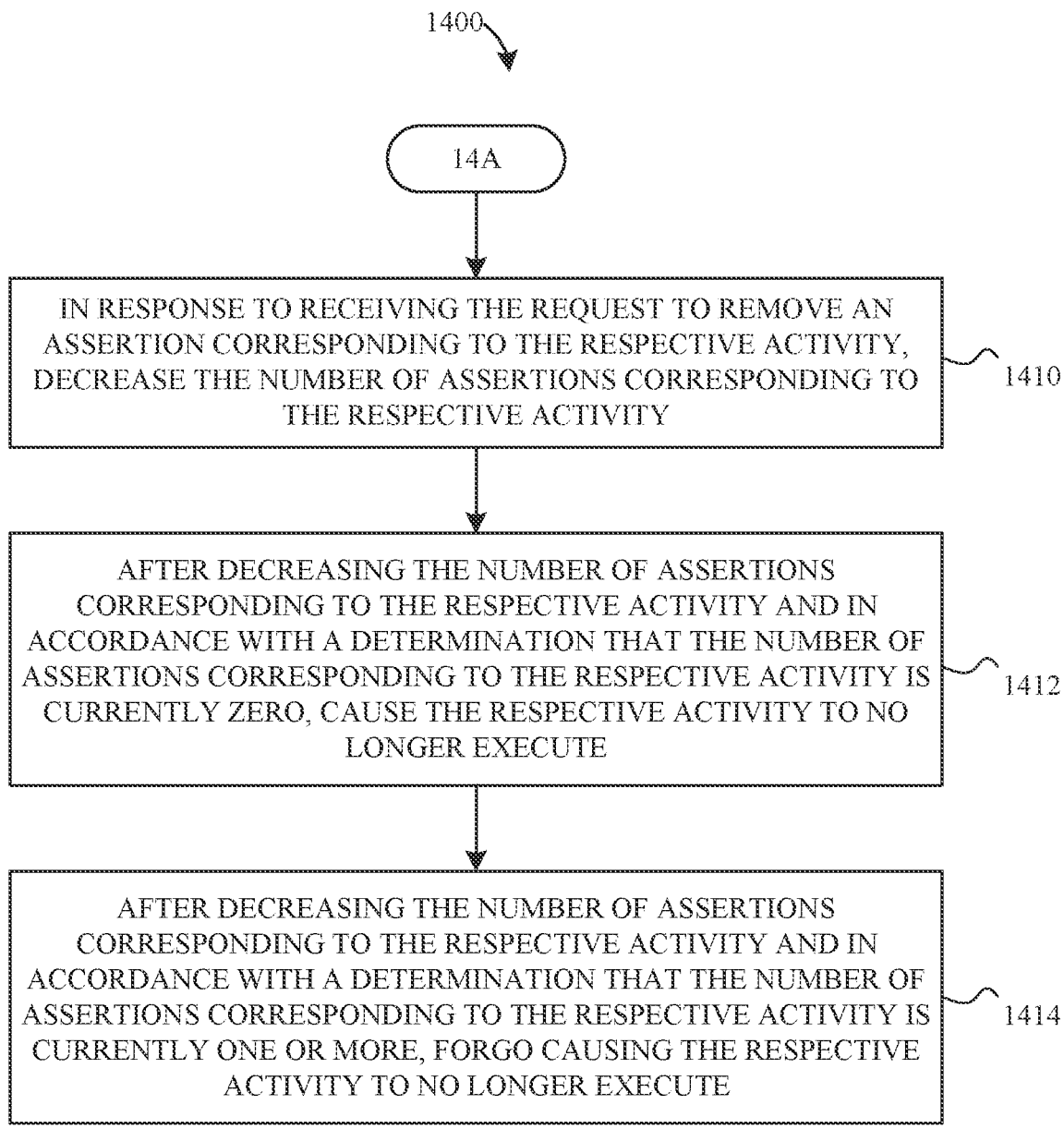
FIG. 14B continues from FIG. 14A and further illustrates the method for changing the state of the activity in accordance with some examples.

FIG. 13 is a flow diagram illustrating a method (e.g., method 1300) for coordinating changes of a coordinator role as a member of a group in accordance with some examples. Some operations in method 1300 are, optionally, combined, the orders of some operations are, optionally, changed, and some operations are, optionally, omitted.

As described below, method 1300 provides an intuitive way for coordinating changes of a coordinator role as a member of a group. Method 1300 reduces the cognitive burden on a user for coordinating changes of a coordinator role as a member of a group, thereby creating a more efficient human-machine interface. For battery-operated computing devices, enabling a user to coordinating changes of a coordinator role as a member of a group faster and more efficiently conserves power and increases the time between battery charges.

In some examples, method 1300 is performed by a first device (e.g., as described above with respect to the second device of method 1200) associated with (e.g., as described above with respect to method 1200) a group of devices (e.g., as described above with respect to method 1200), wherein the group of devices includes a second device (e.g., a coordinator device, a member device, a personal device, and/or a communal device) and a third device (e.g., a coordinator device, a member device, a personal device, and/or a communal device), wherein the second device is different from the first device, and wherein the third device is different from the first device and the second device. In some examples, the first device, the second device, and/or the third device is a phone, a tablet, a laptop, a desktop computer, a fitness tracking device, a wearable device, an accessory device, a smart speaker, and/or a television. In some examples, method 1300 is performed by a system process of the first device, such as a process configured to communicate with respect to the group of devices. In some examples, the first device is not a coordinator of the group of devices.

At 1302, the first device synchronizes, with the second device (e.g., in accordance with a determination that the second device is a coordinator of the group of devices) a set of information (e.g., a third cluster list of running activities as described above with respect to method 1200 and/or data stored by the first device). In some examples, synchronizing, with the second device, the set of information includes sending data (e.g., a first cluster list of running activities as described above with respect to method 1200 and/or data stored by the first device) to the second device and/or receiving data (e.g., a third cluster list of running activities as described above with respect to method 1200 or data stored by the second device) from the second device.

At 1304, after synchronizing the set of information and in response to detecting a new coordinator (e.g., a new coordinator device) is elected for the group of devices, the first device identifies a locally stored version of the set of information (e.g., the set of information that is stored by the first device).

At 1306, after synchronizing the set of information and in response to detecting the new coordinator is elected for the group of devices, the first device sends, to the third device (e.g., in accordance with a determination that the third device is the new coordinator of the group of devices), the locally stored version of the set of information.

At 1308, after (e.g., and/or as a response to) sending the locally stored version of the set of information, the first device receives, from the third device, a new set of information (e.g., the locally stored version of the set of information with an updated timestamp (e.g., when the locally stored version is still synchronized with the group of devices) and/or a different version of the set of information (e.g., when the locally stored version is not still synchronized with the group of devices)).

At 1310, in response to receiving the new set of information, the first device stores the new set of information as a replacement of the locally stored version of the set of information. In some examples, the new set of information is used by the first device to determine what activity to execute and/or how to execute an activity (e.g., as described above with respect to other figures).

In some examples, sending, to the third device, the locally stored version of the set of information includes sending a timestamp (e.g., a time that the locally stored version was stored by the first device, a time that the set of information was synchronized with the first device, or a time that the locally stored version was last updated and/or confirmed for accuracy) corresponding to the locally stored version of the set of information.

In some examples, the new set of information matches (e.g., is the same as) the locally stored version. In some examples, the new set of information is associated with an updated timestamp that is different from a timestamp associated with the locally stored version (e.g., a timestamp corresponding to the new set of information is more recent than a timestamp corresponding to the locally stored version). In some examples, the updated timestamp corresponds to when the new set of information was stored, sent to, and/or received by the first device.

In some examples, the set of information includes a list of running activities within the group of devices (e.g., a third cluster list of running activities, as described above with respect to method 1200).

In some examples, identifying the locally stored version of the set of information includes identifying (e.g., accessing, obtaining, retrieving) a locally stored version of a list of running activities within the first device (e.g., an effective list and/or a pending activity list). In some examples, the locally stored version of the set of information includes a list of running activities within the group of devices (e.g., a cluster list) and the list of running activities within the first device.

In some examples, each running activity of the list of running activities is associated with a unique identifier (e.g., a first running activity of the list of running activities is associated with a first unique identifier, and a second running activity (e.g., different from the first running activity) of the list of running activities is associated with a second unique identifier (e.g., the same as the first unique identifier, such as corresponding to a device, or different from the second unique identifier)). In some examples, the list of running activities includes the first unique identifier and/or the second unique identifier.

In some examples, the set of information is not synchronized with the third device by the first device. In some examples, the new set of information is not synchronized with the second device by the first device. In some examples, the set of information is synchronized with the third device by the second device. In some examples, the new set of information is synchronized with the second device by the third device.

In some examples, while the second device is elected as a coordinator of the group of devices, the first device receives, from the second device, a second new set of information different from the set of information and new set of information (e.g., without receiving, from the third device, a respective set of information). In some examples, while the third device is elected as the new coordinator for the group of devices, the first device receives, from the third device, a third new set of information different from the second new set of information, the new set of information, and the set of information (e.g., without receiving, from the second device, a respective set of information).

In some examples, after storing the new set of information as a replacement of the locally stored version of the set of information, the first device identifies a change to the new set of information. In some examples, in response to identifying the change, the first device provides, to the third device, an indication of the change to the new set of information (e.g., an updated set of information and/or a new version of the new set of information including the change to the new set of information).

Note that details of the processes described above with respect to method 1300 (e.g., FIG. 13) are also applicable in an analogous manner to other methods described herein. For example, method 1200 optionally includes one or more of the characteristics of the various methods described above with reference to method 1300. For example, the first device of method 1300 may be the second device of method 1200. For brevity, these details are not repeated below.

FIG. 14 is a flow diagram illustrating a method (e.g., method 1400) for changing a state of an activity in accordance with some examples. Some operations in method 1400 are, optionally, combined, the orders of some operations are, optionally, changed, and some operations are, optionally, omitted.

As described below, method 1400 provides an intuitive way for changing a state of an activity. Method 1400 reduces the cognitive burden on a user for changing a state of an activity, thereby creating a more efficient human-machine interface. For battery-operated computing devices, enabling a user to change a state of an activity faster and more efficiently conserves power and increases the time between battery charges.

In some examples, method 1400 is performed by a first device (e.g., as described above with respect to method 1200) associated with (e.g., as described above with respect to method 1200) a group of devices (e.g., as described above with respect to method 1200), wherein the group of devices includes a first respective device (e.g., as described above with respect to the second device and/or the third device in method 1200) different from the first device. In some examples, method 1400 is performed by a system process of the first device, such as a process configured to communicate with respect to the group of devices.

At 1402, the first device receives, from the first respective device in the group of devices, an assertion (e.g., a communication, a message, and/or an indication) corresponding to a respective activity. In some examples, an assertion is and/or includes a request to execute (e.g., change a state from inactive to active, change from a closed activity to an active activity (e.g., a background or a foreground process), and/or change from a suspended or hibernated process to an active activity) the respective activity. In some examples, an assertion is and/or includes a request to use and/or maintain execution of the respective activity. In some examples, the assertion is with respect to the respective device such that the respective device is requesting that the respective device executes the respective activity. In some examples, the assertion is with respect to the group of devices such that the respective device is requesting that a device in the group of devices (e.g., not necessarily the respective device) executes the respective activity.

At 1404, in response to receiving the assertion corresponding to the respective activity, the first device increases (e.g., in accordance with a determination that the respective device has not already provided an assertion corresponding to the respective activity) a number of assertions (e.g., from zero to one and/or from another value to a value one more than the other value) corresponding to the respective activity. In some examples, in response to receiving the assertion corresponding to the respective activity, adding the assertion to a list of assertions corresponding to the respective activity. In some examples, adding the assertion to a list of assertions corresponding to the respective activity includes adding information included in the assertion to the list of assertions corresponding to the respective activity.

At 1406, in response to receiving the assertion corresponding to the respective activity, after (e.g., in response to and/or at least partially in parallel with) increasing the number of assertions and in accordance with a determination that the number of assertions corresponding to the respective activity is currently one, the first device causes the respective activity to execute. In some examples, the respective activity is caused to be executed on the first device, the respective device, and/or another device. In some examples, causing the respective activity to execute includes executing the respective activity. In some examples, causing the respective activity to execute includes sending, to the respective device, a request to execute the respective activity. In some examples, causing the respective activity to execute includes sending, to a device other than the first device and the respective device, a request to execute the respective activity. In some examples, causing the respective activity to execute includes causing the respective activity to execute on each device in the group of devices. In some examples, causing the respective activity to execute includes updating a cluster list published to other devices, the updated cluster list indicating that the activity should be executed. In such examples, merging the updated cluster list into an effective list on a device causes the activity to be executed. In some examples, in accordance with a determination that the number of assertions corresponding to the respective activity is currently more than one, the first device forgoes causing the respective activity to execute. In some examples, in accordance with a determination that the number of assertions corresponding to the respective activity is currently more than one, the first device causes the respective activity to execute (e.g., on the respective device). It should be recognized that causing the respective activity to execute before increasing the number of assertions and in accordance with a determination that the number of assertions corresponding to the respective activity is currently zero is equivalent to causing the respective activity to execute after increasing the number of assertions and in accordance with a determination that the number of assertions corresponding to the respective activity is currently one. It should be recognized that causing or forgoing causing the respective activity to execute before increasing the number of assertions and in accordance with a determination that the number of assertions corresponding to the respective activity is currently one is equivalent to causing or forgoing causing the respective activity to execute after increasing the number of assertions and in accordance with a determination that the number of assertions corresponding to the respective activity is currently more than one.

At 1408, while the respective activity is executing (e.g., on the first device, the respective device, and/or a device different from the first device and the respective device) (e.g., after causing the respective activity to execute and before causing the respective activity to no longer execute), the first device receives (e.g., accesses, downloads, and/or obtains), from a second respective device (e.g., the first respective device and/or a device different from the first device and the second respective device) (e.g., as described above with respect to the second device and/or the third device in method 1200) in the group of devices, a request to remove an assertion (e.g., the assertion or another assertion different from the assertion) corresponding to the respective activity.

At 1410, in response to receiving the request to remove an assertion corresponding to the respective activity, the first device decreases (e.g., in accordance with a determination that the respective device has not already provided a request to remove an assertion corresponding to the respective activity) the number of assertions (e.g., from one to zero and/or from another value to a value one less than the other value) corresponding to the respective activity.

At 1412, in response to receiving the request to remove an assertion corresponding to the respective activity, after decreasing the number of assertions corresponding to the respective activity, in accordance with a determination that the number of assertions corresponding to the respective activity is currently zero, the first device causes the respective activity to no longer execute (e.g., change a state from active to inactive and/or change from an active process to a closed, a suspended, or a hibernated activity). It should be recognized that causing the respective activity to no longer execute before decreasing the number of assertions and in accordance with a determination that the number of assertions corresponding to the respective activity is currently one is equivalent to causing the respective activity to execute after decreasing the number of assertions and in accordance with a determination that the number of assertions corresponding to the respective activity is currently zero.

At 1414, in response to receiving the request to remove an assertion corresponding to the respective activity, after decreasing the number of assertions corresponding to the respective activity, in accordance with a determination that the number of assertions corresponding to the respective activity is currently one or more (e.g., indicating that a device in the group of devices has provided an assertion corresponding to the respective activity without removing the assertion), the first device forgoes causing the respective activity to no longer execute. In some examples, after causing the respective activity to no longer execute, the first device removes the respective activity from a cluster list of activities (e.g., as described above with respect to method 1200) to generate an updated cluster list of activities. In some examples, in response to generating the updated cluster list of activities, the first device provides, to the first respective device, the updated cluster list of activities. In some examples, the updated cluster list of activities is provided to each device in the group of devices. It should be recognized that forgoing causing the respective activity to no longer execute before decreasing the number of assertions and in accordance with a determination that the number of assertions corresponding to the respective activity is currently two or more is equivalent to forgoing causing the respective activity to execute after decreasing the number of assertions and in accordance with a determination that the number of assertions corresponding to the respective activity is currently one or more.

In some examples, the group of devices includes the first device.

In some examples, after detecting (e.g., receives an indication that and/or identifies a connection loss with) a member device (e.g., the first respective device, the second respective device, or a different respective device) has left the group of devices (e.g., is no longer a member device of the group of devices), the first device identifies an existing activity (e.g., in the cluster list of running activities) associated with (e.g., that includes an assertion from) the member device. In some examples, in response to identifying the existing activity and in accordance with a determination that the existing activity does not include an assertion from a device of the group of devices other than the member device, the first device causes the existing activity to no longer execute (e.g., and/or removes the existing activity from the cluster list of running activities) (e.g., on a respective device (e.g., the first device and/or a device different from the member device) in the group of devices). In some examples, in response to identifying the existing activity and in accordance with a determination that the existing activity does not include an assertion from a device of the group of devices other than the member device (e.g., and/or in conjunction with causing the activity to no longer execute), the first device provides an updated cluster list of running activities to one or more devices of the group of devices, the updated cluster list of running activities not including the existing activity.

In some examples, in response to receiving the assertion corresponding to the respective activity and in accordance with the respective activity executing in a first manner (e.g., as a background or foreground process) (e.g., performing a first operation rather than a second operation) on the first respective device, the first device causes the respective activity to execute in a second manner (e.g., as a foreground process when previously as a background process or vice versa) (e.g., performing the second operation rather than the first operation) on the first respective device, wherein the second manner is different from the first manner.

In some examples, while a second respective activity is executing, the first device receives (e.g., accesses, downloads, and/or obtains), from a third respective device in the group of devices, a request to cause the second respective activity to no longer execute. In some examples, in response to receiving the request to cause the second respective activity to no longer execute, the first device causes the second respective activity to no longer execute (e.g., change a state from active to inactive and/or change from an active activity to a closed, a suspended, or a hibernated activity) (e.g., as a result of the request causing all outstanding assertions to be invalidated, even while multiple assertions remained before the request was received).

In some examples, the assertion is associated with a unique identifier.

In some examples, after (e.g., in response to and/or in conjunction with) receiving the assertion corresponding to the respective activity, the first device generates (e.g., determines, identifies, and/or creates) a cluster list of running activities (e.g., the cluster list of running activities supersede a respective cluster list of running activities on the second device and/or the third device) corresponding to the group of devices, wherein the cluster list of running activities includes the respective activity. In some examples, after receiving the assertion corresponding to the respective activity (and/or in response to generating the cluster list of running activities), the first device provides (e.g., sends, transmits, uploads, and/or stores), to one or more member devices of the group of devices, the cluster list of running activities. In some examples, after receiving the assertion corresponding to the respective activity, where the assertion is associated with a unique identifier, the generated cluster list of running activities includes the respective activity and the unique identifier (e.g., the cluster list of running activities includes a first activity corresponding to a first unique identifier and a second activity (e.g., different than the first activity) corresponding to a second unique identifier (e.g., different than the first unique identifier)).

In some examples, after (e.g., in response to and/or in conjunction with) receiving the assertion corresponding to the respective activity, the first device provides, to the first respective device, an acknowledgement of the assertion. In some examples, the acknowledgement includes an indication to change a state of the respective activity.

Note that details of the processes described above with respect to method 1400 (e.g., FIG. 14) are also applicable in an analogous manner to other methods described herein. For example, method 1500 optionally includes one or more of the characteristics of the various methods described above with reference to method 1400. For example, after increasing the number of assertions and causing the respective activity to execute, according to method 1400, the first device may receive a request to change a state of the respective activity, according to method 1500. For brevity, these details are not repeated below.

Figure 15:
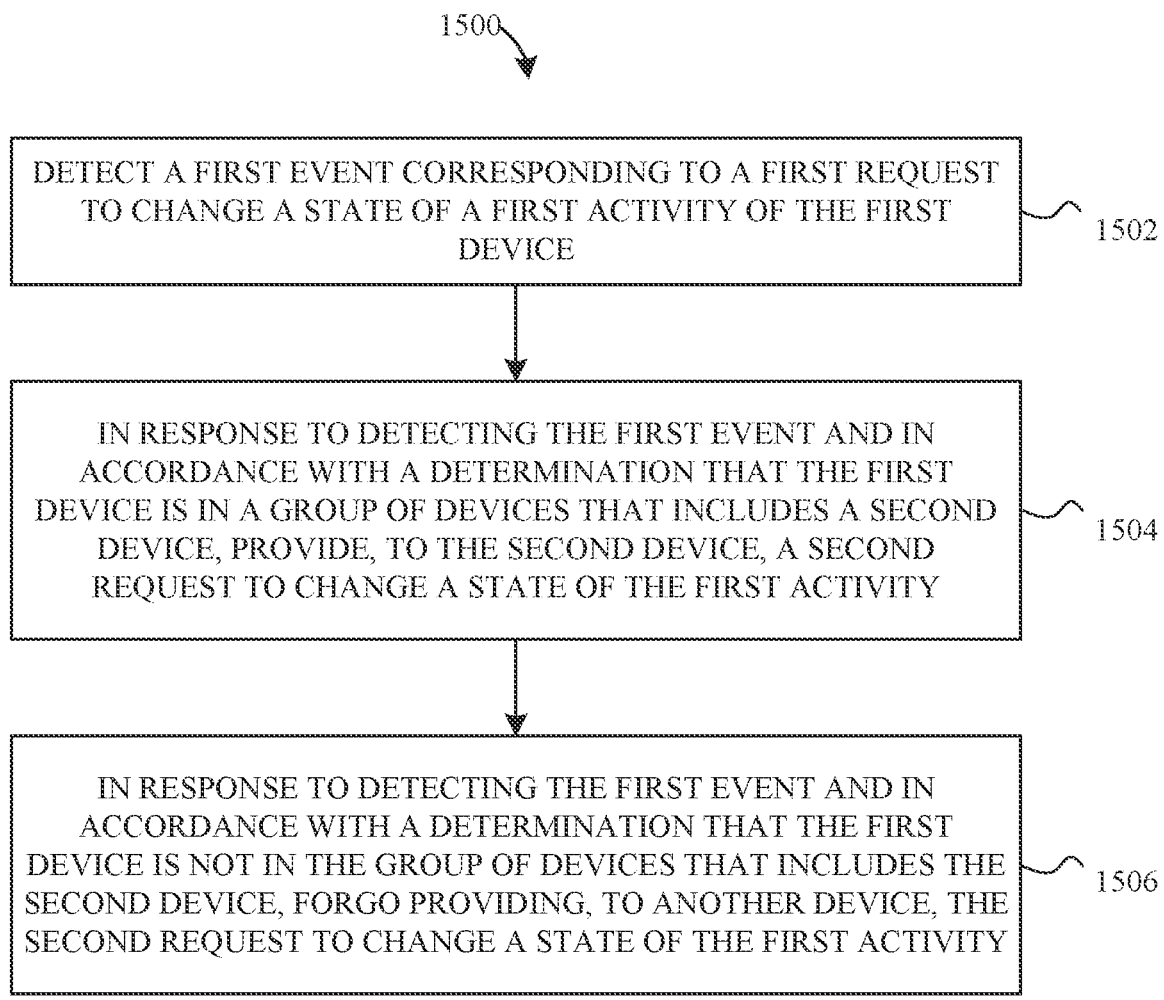
FIG. 15 is a flow diagram illustrating a method for selectively sending requests to change a state of a local activity in accordance with some examples.

FIG. 15 is a flow diagram illustrating a method (e.g., method 1500) for selectively sending requests to change a state of a local activity in accordance with some examples. Some operations in method 1500 are, optionally, combined, the orders of some operations are, optionally, changed, and some operations are, optionally, omitted.

As described below, method 1500 provides an intuitive way for selectively sending requests to change a state of a local activity. Method 1500 reduces the cognitive burden on a user for selectively sending requests to change a state of a local activity, thereby creating a more efficient human-machine interface. For battery-operated computing devices, enabling a user to selectively send requests to change a state of a local activity faster and more efficiently conserves power and increases the time between battery charges.

In some examples, method 1500 is performed by a first device (e.g., as described above with respect to method 1200).

At 1502, the first device detects a first event corresponding to a first request to change a state (e.g., execute, change to a foreground process, change to a background process, close, suspend, and/or hibernate) of a first activity (e.g., a local process, a user process, an application process, an unexecuted process, an active process, a foreground process, a background process, a hibernated process, a suspended process, and/or a closed process) of the first device. In some examples, an activity corresponds to a personal assistant application, a media application, a communication application (e.g., audio, video, and/or text communication), a calculator application, a word processing application, a calendar application, and/or a web browser application. In some examples, the first activity is running and/or executing (e.g., in the foreground and/or background) on the first device. In some examples, the first activity is not running and/or executing on the first device. In some examples, the first activity is suspended, hibernated, or closed. In some examples, the first event is a first type of event. In some examples, an activity includes, corresponds to, and/or is a program, an application, and/or an executable. In some examples, the first request includes and/or is an interrupt or other OS-based signal. In some examples, the first request is sent by the first activity. In some examples, the first request is sent by an activity different from the first activity. In some examples, the activity different from the first activity is a system process (e.g., corresponding to an operating system of the first device). In some examples, an application includes the first activity and the activity different from the first activity.

At 1504, in response to detecting the first event, in accordance with a determination that the first device is in a group of devices (e.g., as described above with respect to method 1200) that includes a second device (e.g., as described above with respect to method 1200) (e.g., and/or in accordance with a determination that the second device is a coordinator of the group of devices), the first device provides (e.g., sends, transmits, uploads, and/or stores), to the second device, a second request (e.g., the first request or a request generated based on the first request that is different from the first request) to change a state of the first activity. In some examples, the second request includes an indication and/or an identification of the first activity. In some examples, the second request includes an indication and/or identification of the first device. In some examples, the second request includes and/or is a packet and/or a network-based signal.

At 1506, in response to detecting the first event, in accordance with a determination that the first device is not in the group of devices that includes the second device (e.g., and/or in accordance with a determination that the first device is a coordinator of a second group of devices (e.g., the same as or different from the group of devices) and/or in accordance with a determination that the first device is not in a group of devices with another device), the first device forgoes providing, to another device (e.g., the second device and/or a device different from the first device and the second device), the second request (e.g., and/or any request) to change a state of the first activity. In some examples, at the time of detecting the first event, the first device is in a group of devices that does not include other devices. In some examples, the first device being the coordinator of the group of devices when the group of devices only includes the first device is equivalent to the first device not being in a group of devices. In some examples, in response to detecting the first event and in accordance with a determination that the first device is the coordinator of the group of devices, the first device updates (e.g., based on the first request) a state of the first activity. In some examples, changing the state of the first activity includes changing the first activity to a foreground, background, hibernated, suspended, and/or closed process and/or changing the priority (e.g., ranked list) of the first activity (e.g., increasing or decreasing the priority of the first activity such that the first activity executes before a different activity of a lower priority and after a different activity of a higher priority). In some examples, in response to detecting the first event and in accordance with a determination that the first device is the coordinator of the group of devices, the first device generates (e.g., determines, identifies, updates, and/or creates) a cluster list of activities (e.g., as described above with respect to method 1200) (e.g., to include and/or modify information related to the first activity when the change does not cause the first activity to cease running and/or executing (e.g., being an active activity)) (e.g., to not include the first activity when the change causes the first activity to cease running and/or executing). In some examples, the cluster list is based on a respective cluster list from the first device. In some examples, the cluster list is timestamped (e.g., by the first device and/or according to a clock of the first device). In some examples, in response to detecting the first event and in accordance with a determination that the first device is the coordinator of the group of devices, the first device provides (e.g., sends, transmits, uploads, and/or stores), to the second device and/or one or more other devices in the group of devices, the cluster list of activities. In some examples, the cluster list of activities is provided to each device in the group of devices.

In some examples, the first request includes a request to execute the first activity.

In some examples, the first request includes a request to change a state of the first activity from a background process to a foreground process (e.g., on the first device or a device different from the first device).

In some examples, the first device detects a second event corresponding to a third request to change a state of a second activity of the first device, wherein the second activity is different from the first activity. In some examples, in response to detecting the second event, in accordance with a determination that the first device is in a group of devices that includes a third device (e.g., the second device or a device different from the second device) (e.g., and/or in accordance with a determination that the third device is a coordinator of the group of devices that includes the third device), the first device provides (e.g., sends, transmits, uploads, and/or stores), to the third device, a fourth request (e.g., the third request or a request generated based on the third request that is different from the third request) to change a state of the second activity. In some examples, in response to detecting the second event and in accordance with a determination that the first device is not in the group of devices that includes the third device (e.g., and/or in accordance with a determination that the third device is not a coordinator of the group of devices that includes the third device), the first device forgoes providing, to the third device, the fourth request to change the state of the second activity.

In some examples, in response to detecting the first event, in accordance with the determination that the first device is not in a group of devices, the first device changes (e.g., locally) the state of the first activity according to the first request (e.g., without requesting to change the state of the first activity through another device).

In some examples, after providing the second request to change the state of the first activity and detecting a new coordinator (e.g., a new coordinator device) is elected for the group of devices, the first device detects a third event corresponding to a fifth request to change a state of the first activity. In some examples, in response to detecting the third event (e.g., and/or in accordance with a determination that the first device is the new coordinator), the first device forgoes providing, to another device (e.g., the second device and/or a device different from the first device and the second device), a request (e.g., and/or any request) to change a state of the first activity.

In some examples, the first device detects, via one or more sensors of the first device, a request to stop (e.g., change a state from active to inactive and/or change from an active activity to a closed, a suspended, or a hibernated activity) a second activity (e.g., the first activity or an activity different from the first activity) that was initiated from a respective device of the group of devices, wherein the respective device is different from the first device (e.g., and, in some examples, the second device). In some examples, the one or more sensors are in communication with and/or integrated into the first device. In some examples, in response to detecting the request to stop the second activity (e.g., and/or in accordance with a determination that the second device is a current coordinator of the group of devices), the first device provides, to the second device, the request to stop the second activity.

In some examples, in response to detecting the first event, the first device updates (e.g., based on the first request) a state of the first process and adds the updated first process to a pending activity list of the first device. In some examples, the first device generates an effective list including one or more activities (e.g., the updated first process) from the pending activity list.

In some examples, the first process of the first device is associated with a unique identifier, and updating the state of the first process includes updating the unique identifier.

Note that details of the processes described above with respect to method 1500 (e.g., FIG. 15) are also applicable in an analogous manner to the methods described herein. For example, method 1400 optionally includes one or more of the characteristics of the various methods described above with reference to method 1500. For example, the first device may receive a request to change a state of an activity, according to method 1500, that causes the activity to begin executing with an assertion corresponding to the requesting device, and the assertion of the activity may affect the activity according to method 1400 (e.g., if the first device leaves the group, the assertion may be removed and the activity may be terminated). For brevity, these details are not repeated below.

In the disclosure above, the terms "activity" and "activities" are used throughout. In some examples, an activity is a process, such as a running and/or executing process. In other examples, an activity is a set of instructions and/or operations that, in some examples, execute in a process. In some examples, multiple "activities" are included in a single process.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve how a user can interact with multiple devices. The present disclosure contemplates that in some instances, this gathered data can include personal information data that uniquely identifies or can be used to contact or locate a specific person. Such personal information data can include voice data, interaction data, device identifiers, or any other identifying information.

The present disclosure recognizes that the use of such personal information data, in the present technology, can be used to the benefit of users. For example, the personal information data can be used to change how a user interacts with a device. Accordingly, use of such personal information data enables better device interactions. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of image capture, the present technology can be configured to allow users to select to "opt in" or "opt out" of participation in the collection of personal information data during registration for services.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, a user may interact with devices with manual controls rather than voice controls.

What is claimed is:

1. A method, comprising:
by a first device associated with a group of devices, wherein the group of devices includes a second device and a third device, wherein the second device is different from the first device, and wherein the third device is different from the first device and the second device:
receiving, from the second device, a first cluster list of running activities;
receiving, from the third device, a second cluster list of running activities;
generating, based on the first cluster list of running activities and the second cluster list of running activities, a third cluster list of activities corresponding to the group of devices; and
providing, to the second device and the third device, the third cluster list of activities.

2. The method of claim 1, wherein at least one device of the group of devices is an accessory device.

3. The method of claim 1, further comprising:
receiving, by a first process of the first device, a fourth cluster list of running activities, wherein the fourth cluster list of running activities corresponds to the first device, and wherein the group of devices includes the first device.

4. The method of claim 3, wherein the third cluster list of activities includes a respective activity not installed, running, or any combination thereof on the first device.

5. The method of claim 4, further comprising:
detecting, via an input component of the first device, an input; and
in response to detecting the input, providing, to another device of the group of devices, a message to cause a change to the respective activity.

6. The method of claim 3, wherein the third cluster list of activities corresponding to the group of devices is further based on the fourth cluster list of running activities.

7. The method of claim 1, wherein the third cluster list of activities is one of the first cluster list of running activities or the second cluster list of running activities.

8. The method of claim 7, wherein:
in accordance with a determination that the first cluster list of running activities is associated with a timestamp more recent than a timestamp associated with the second cluster list of running activities, the third cluster list of activities is the first cluster list of running activities; and
in accordance with a determination that the second cluster list of running activities is associated with a timestamp more recent than a timestamp associated with the first cluster list of running activities, the third cluster list of activities is the second cluster list of running activities.

9. The method of claim 1, wherein the first device is associated with a second group of devices different from the group of devices, the method further comprising:
synchronizing, with the second group of devices, a fifth cluster list of activities separate from the third cluster list of activities.

10. The method of claim 1, wherein the third cluster list of activities includes a state of a first respective activity and a state of a second respective activity different from the first respective activity.

11. The method of claim 1, wherein each activity of the third cluster list of activities is associated with a unique identifier.

12. The method of claim 1, further comprising:
after providing the third cluster list of activities to the second device, receiving, from the second device, an assertion signal including identification of a new activity not included in the third cluster list of activities; and
after receiving the assertion signal, generating a sixth cluster list of activities different from the third cluster list of activities, wherein the sixth cluster list of activities includes an identification of the new activity.

13. The method of claim 12, wherein the assertion signal includes a unique identifier corresponding to the new activity, and wherein the sixth cluster list of activities includes the unique identifier.

14. The method of claim 1, further comprising:
after providing the third cluster list of activities to another device of the group of devices, receiving, from a fourth device of the group of devices, a second assertion signal including identification of an existing activity included in the third cluster list of activities; and
after receiving the second assertion signal, causing a fifth device of the group of devices to execute the existing activity as a background process.

15. The method of claim 1, further comprising:
after providing the third cluster list of activities to another device of the group of devices, receiving a third assertion signal including identification of a first existing activity included in the third cluster list of activities; and
after receiving the third assertion signal, generating an eighth cluster list of activities including an identification of the first existing activity.

16. The method of claim 15, wherein, before receiving the third assertion signal, the third cluster list of activities includes a first unique identifier corresponding to the first existing activity, wherein the eighth cluster list of activities includes a second unique identifier corresponding to the first existing activity, wherein the second unique identifier is different from the first unique identifier.

17. The method of claim 1, further comprising:
after providing the third cluster list of activities to another device of the group of devices, receiving, from a sixth device of the group of devices, a fourth assertion signal including identification of a second existing activity included in the third cluster list of activities; and
after receiving the fourth assertion signal, generating a ninth cluster list of activities not including an identification of the second existing activity.

18. The method of claim 1, wherein:
the first cluster list of running activities includes an indication of an activity currently running on the second device;
the second cluster list of running activities includes an indication of an activity currently running on the third device; and
the third cluster list of activities includes an indication of an activity that should be currently running.

19. The method of claim 1, wherein the third cluster list of activities that is sent to the second device includes an indication of an activity that should be currently running on the second device, and wherein the third cluster list of activities that is sent to the third device includes an indication of an activity that should be currently running on the third device.

20. The method of claim 1, wherein the third cluster list of activities that is sent to the second device includes an indication of an activity that should be currently running on the third device.

21. A non-transitory computer-readable medium storing one or more programs configured to be executed by one or more processors of a first device associated with a group of devices, wherein the group of devices includes a second device and a third device, wherein the second device is different from the first device, and wherein the third device is different from the first device and the second device, the one or more programs including instructions for performing a method comprising:
receiving, from the second device, a first cluster list of running activities;
receiving, from the third device, a second cluster list of running activities;
generating, based on the first cluster list of running activities and the second cluster list of running activities, a third cluster list of activities corresponding to the group of devices; and
providing, to the second device and the third device, the third cluster list of activities.

22. The non-transitory computer-readable medium of claim 21, wherein at least one device of the group of devices is an accessory device.

23. The non-transitory computer-readable medium of claim 21, the method further comprising:
receiving, by a first process of the first device, a fourth cluster list of running activities, wherein the fourth cluster list of running activities corresponds to the first device, and wherein the group of devices includes the first device.

24. The non-transitory computer-readable medium of claim 23, wherein the third cluster list of activities includes a respective activity not installed, running, or any combination thereof on the first device.

25. The non-transitory computer-readable medium of claim 24, the method further comprising:
detecting, via an input component of the first device, an input; and
in response to detecting the input, providing, to another device of the group of devices, a message to cause a change to the respective activity.

26. The non-transitory computer-readable medium of claim 21, wherein the third cluster list of activities is one of the first cluster list of running activities or the second cluster list of running activities.

27. The non-transitory computer-readable medium of claim 26, wherein:
in accordance with a determination that the first cluster list of running activities is associated with a timestamp more recent than a timestamp associated with the second cluster list of running activities, the third cluster list of activities is the first cluster list of running activities; and
in accordance with a determination that the second cluster list of running activities is associated with a timestamp more recent than a timestamp associated with the first cluster list of running activities, the third cluster list of activities is the second cluster list of running activities.

28. The non-transitory computer-readable medium of claim 21, wherein the first device is associated with a second group of devices different from the group of devices, the method further comprising:
synchronizing, with the second group of devices, a fifth cluster list of running activities separate from the third cluster list of activities.

29. The non-transitory computer-readable medium of claim 21, wherein the third cluster list of activities includes a state of a first respective activity and a state of a second respective activity different from the first respective activity.

30. The non-transitory computer-readable medium of claim 21, wherein each activity of the third cluster list of activities is associated with a unique identifier.

31. The non-transitory computer-readable medium of claim 21, the method further comprising:
after providing the third cluster list of activities to the second device, receiving, from the second device, an assertion signal including identification of a new activity not included in the third cluster list of running activities; and
after receiving the assertion signal, generating a sixth cluster list of running activities different from the third cluster list of activities, wherein the sixth cluster list of running activities includes an identification of the new activity.

32. The non-transitory computer-readable medium of claim 31, wherein the assertion signal includes a unique identifier corresponding to the new activity, and wherein the sixth cluster list of running activities includes the unique identifier.

33. The non-transitory computer-readable medium of claim 21, the method further comprising:
after providing the third cluster list of activities to another device of the group of devices, receiving, from a fourth device of the group of devices, a second assertion signal including identification of an existing activity included in the third cluster list of activities; and
after receiving the second assertion signal, causing a fifth device of the group of devices to execute the existing activity as a background process.

34. The non-transitory computer-readable medium of claim 21, the method further comprising:
after providing the third cluster list of activities to another device of the group of devices, receiving a third assertion signal including identification of a first existing activity included in the third cluster list of activities; and
after receiving the third assertion signal, generating an eighth cluster list of running activities including an identification of the first existing activity.

35. The non-transitory computer-readable medium of claim 34, wherein, before receiving the third assertion signal, the third cluster list of activities includes a first unique identifier corresponding to the first existing activity, wherein the eighth cluster list of running activities includes a second unique identifier corresponding to the first existing activity, wherein the second unique identifier is different from the first unique identifier.

36. The non-transitory computer-readable medium of claim 21, the method further comprising:
after providing the third cluster list of activities to another device of the group of devices, receiving, from a sixth device of the group of devices, a fourth assertion signal including identification of a second existing activity included in the third cluster list of activities; and
after receiving the fourth assertion signal, generating a ninth cluster list of running activities not including an identification of the second existing activity.

37. The non-transitory computer-readable medium of claim 23, wherein the third cluster list of activities corresponding to the group of devices is further based on the fourth cluster list of running activities.

38. The non-transitory computer-readable medium of claim 21, wherein:
the first cluster list of running activities includes an indication of an activity currently running on the second device;
the second cluster list of running activities includes an indication of an activity currently running on the third device; and
the third cluster list of activities includes an indication of an activity that should be currently running.

39. The non-transitory computer-readable medium of claim 21, wherein the third cluster list of activities that is sent to the second device includes an indication of an activity that should be currently running on the second device, and wherein the third cluster list of activities that is sent to the third device includes an indication of an activity that should be currently running on the third device.

40. The non-transitory computer-readable medium of claim 21, wherein the third cluster list of activities that is sent to the second device includes an indication of an activity that should be currently running on the third device.

41. A first device associated with a group of devices, wherein the group of devices includes a second device and a third device, wherein the second device is different from the first device, and wherein the third device is different from the first device and the second device, comprising:
one or more processors; and
memory storing one or more programs configured to be executed by the one or more processors, the one or more programs including instructions for performing a method comprising:
receiving, from the second device, a first cluster list of running activities;
receiving, from the third device, a second cluster list of running activities;
generating, based on the first cluster list of running activities and the second cluster list of running activities, a third cluster list of activities corresponding to the group of devices; and
providing, to the second device and the third device, the third cluster list of activities.

42. The first device of claim 41, wherein at least one device of the group of devices is an accessory device.

43. The first device of claim 41, the method further comprising:
receiving, by a first process of the first device, a fourth cluster list of running activities, wherein the fourth cluster list of activities corresponds to the first device, and wherein the group of devices includes the first device.

44. The first device of claim 43, wherein the third cluster list of activities includes a respective activity not installed, running, or any combination thereof on the first device.

45. The first device of claim 44, the method further comprising:
detecting, via an input component of the first device, an input; and
in response to detecting the input, providing, to another device of the group of devices, a message to cause a change to the respective activity.

46. The first device of claim 41, wherein the third cluster list of activities is one of the first cluster list of running activities or the second cluster list of running activities.

47. The first device of claim 42, wherein:
in accordance with a determination that the first cluster list of running activities is associated with a timestamp more recent than a timestamp associated with the second cluster list of running activities, the third cluster list of activities is the first cluster list of running activities; and
in accordance with a determination that the second cluster list of running activities is associated with a timestamp more recent than a timestamp associated with the first cluster list of running activities, the third cluster list of activities is the second cluster list of running activities.

48. The first device of claim 41, wherein the first device is associated with a second group of devices different from the group of devices, the method further comprising:
synchronizing, with the second group of devices, a fifth cluster list of running activities separate from the third cluster list of activities.

49. The first device of claim 41, wherein the third cluster list of activities includes a state of a first respective activity and a state of a second respective activity different from the first respective activity.

50. The first device of claim 41, wherein each running activity of the third cluster list of activities is associated with a unique identifier.

51. The first device of claim 41, the method further comprising:

after providing the third cluster list of activities to the second device, receiving, from the second device, an assertion signal including identification of a new activity not included in the third cluster list of activities; and after receiving the assertion signal, generating a sixth cluster list of running activities different from the third cluster list of activities, wherein the sixth cluster list of running activities includes an identification of the new activity.

52. The first device of claim 47, wherein the assertion signal includes a unique identifier corresponding to the new activity, and wherein the sixth cluster list of running activities includes the unique identifier.

53. The first device of claim 41, the method further comprising:

after providing the third cluster list of activities to another device of the group of devices, receiving, from a fourth device of the group of devices, a second assertion signal including identification of an existing activity included in the third cluster list of activities; and after receiving the second assertion signal, causing a fifth device of the group of devices to execute the existing activity as a background process.

54. The first device of claim 41, the method further comprising:

after providing the third cluster list of activities to another device of the group of devices, receiving a third assertion signal including identification of a first existing activity included in the third cluster list of activities; and after receiving the third assertion signal, generating an eighth cluster list of running activities including an identification of the first existing activity.

55. The first device of claim 50, wherein, before receiving the third assertion signal, the third cluster list of activities includes a first unique identifier corresponding to the first existing activity, wherein the eighth cluster list of running activities includes a second unique identifier corresponding to the first existing activity, wherein the second unique identifier is different from the first unique identifier.

56. The first device of claim 41, the method further comprising:

after providing the third cluster list of activities to another device of the group of devices, receiving, from a sixth device of the group of devices, a fourth assertion signal including identification of a second existing activity included in the third cluster list of activities; and after receiving the fourth assertion signal, generating a ninth cluster list of running activities not including an identification of the second existing activity.

57. The first device of claim 43, wherein the third cluster list of activities corresponding to the group of devices is further based on the fourth cluster list of running activities.

58. The first device of claim 41, wherein:

the first cluster list of running activities includes an indication of an activity currently running on the second device;

the second cluster list of running activities includes an indication of an activity currently running on the third device; and the third cluster list of activities includes an indication of an activity that should be currently running.

59. The first device of claim 41, wherein the third cluster list of activities that is sent to the second device includes an indication of an activity that should be currently running on the second device, and wherein the third cluster list of activities that is sent to the third device includes an indication of an activity that should be currently running on the third device.

60. The first device of claim 41, wherein the third cluster list of activities that is sent to the second device includes an indication of an activity that should be currently running on the third device.

\* \* \* \* \*